United States Patent
Mallette et al.

(10) Patent No.: US 12,529,103 B2
(45) Date of Patent: Jan. 20, 2026

(54) HETEROCHIRAL TRANSLATORS AND MOLECULAR CIRCUITS

(71) Applicants: UNM RAINFOREST INNOVATIONS, Albuquerque, NM (US); THE TRUSTEES OF COLUMBIA UNIVERSITY IN THE CITY OF NEW YORK, New York, NY (US)

(72) Inventors: Tracy L. Mallette, Albuquerque, NM (US); Matthew R. Lakin, Albuquerque, NM (US); Darko Stefanovic, Albuquerque, NM (US); Milan N. Stojanovic, Ridgewood, NJ (US)

(73) Assignees: UNM Rainforest Innovations, Albuquerque, NM (US); The Trustees of Columbia Unversity in the city of New York, New York, NY (US)

( * ) Notice: Subject to any disclaimer, the term of this patent is extended or adjusted under 35 U.S.C. 154(b) by 928 days.

(21) Appl. No.: 17/669,007

(22) Filed: Feb. 10, 2022

(65) Prior Publication Data

US 2022/0251648 A1 Aug. 11, 2022

Related U.S. Application Data

(60) Provisional application No. 63/148,369, filed on Feb. 11, 2021.

(51) Int. Cl.
*C12Q 1/6876* (2018.01)
*C12Q 1/44* (2006.01)
*C12Q 1/6816* (2018.01)

(52) U.S. Cl.
CPC ............. *C12Q 1/6876* (2013.01); *C12Q 1/44* (2013.01); *C12Q 1/6816* (2013.01)

(58) Field of Classification Search
None
See application file for complete search history.

(56) References Cited

U.S. PATENT DOCUMENTS

2021/0230593 A1* 7/2021 Han .................. C12N 15/111

FOREIGN PATENT DOCUMENTS

WO WO 2019/152919 A2 8/2019

OTHER PUBLICATIONS

Heterochiral DNA Strand-Displacement Circuits, Journal of the American Chemical Society, 139, 49, 17715-17718 (Year: 2017).*
Heterochiral DNA Strand-Displacement Base on Chimeric D/L-Oligonucleotides, ACS Synthetic Biology, 8, 12, 2756-2759 (Year: 2019).*
Young, "Heterochiral DNA Strand-Displacement Based on Chimeric D/L-Oligonucleotides", *ACS SyntheticBiology*, Oct. 31, 2019, DOI: 10.1021/acssynbio.9b00335.
Wang, "Effective design principles for leakless strand displacement systems", *PNAS*, vol. 115, No. 52, Dec. 13, 2018, 10 pages.
Mallette, "Robust Heterochiral Strand Displacement Using Leakless Translators", *ACS SyntheticBiology*, vol. 9, Jun. 17, 2020, pp. 1907-1910.

* cited by examiner

*Primary Examiner* — Juliet C Switzer
*Assistant Examiner* — Brian Ellis Young
(74) *Attorney, Agent, or Firm* — Mueting Raasch Group

(57) ABSTRACT

A heterochiral strand displacement molecular circuit generally includes an input oligonucleotide, a first translator, a second translator, and an output oligonucleotide. The first translator generally includes a domain that binds to the input binding oligonucleotide, at least a portion of which is complementary to, and has the same chirality as, the input oligonucleotide. The first translator also includes a translation domain having chirality opposite the chirality of the input oligonucleotide (and the binding domain). The second translator generally includes a nucleotide sequence, at least a portion of which is complementary to, and has the same chirality as, the translation domain of the first translator. The output oligonucleotide includes a nucleotide sequence, at least a portion of which is complementary to, and has the same chirality as, the second translator.

8 Claims, 15 Drawing Sheets

Specification includes a Sequence Listing.

(A)

(B)

(C)

(A)

(B)

(A)

(B)

(C)

(A)

(B)

(A)

(B)

HETEROCHIRAL TRANSLATORS AND MOLECULAR CIRCUITS

CROSS-REFERENCE TO RELATED APPLICATION

This application claims the benefit of U.S. Provisional Patent Application No. 63/148,369, filed Feb. 11, 2021, which is incorporated herein by reference in its entirety.

GOVERNMENT FUNDING

This invention was made with government support under 1518861, 1525553, 1763718, and 2044838 awarded by the National Science Foundation. The government has certain rights in the invention.

SEQUENCE LISTING

This application contains a Sequence Listing electronically submitted via EFS-Web to the United States Patent and Trademark Office as an ASCII text file entitled "0310-000165US01_ST25.txt" having a size of 7 kilobytes and created on Feb. 10, 2022. The information contained in the Sequence Listing is incorporated by reference herein.

SUMMARY

This disclosure describes, in one aspect, heterochiral strand displacement molecular circuits. This disclosure describes, in one aspect, a heterochiral strand displacement molecular circuit. Generally, the heterochiral strand displacement molecular circuit includes an input oligonucleotide, a first translator, a second translator, and an output oligonucleotide. The first translator generally includes a domain that binds to the input binding oligonucleotide, at least a portion of which is complementary to, and has the same chirality as, the input oligonucleotide. The first translator also includes a translation domain having chirality opposite the chirality of the input oligonucleotide (and the binding domain). The second translator generally includes a nucleotide sequence, at least a portion of which is complementary to, and has the same chirality as, the translation domain of the first translator. The output oligonucleotide includes a nucleotide sequence, at least a portion of which is complementary to, and has the same chirality as, the second translator.

In some embodiments, the output oligonucleotide includes or generates a detectable signal. In some of these embodiments, the detectable signal can include a colorimetric label, a fluorescent label, a radioactive label, or a magnetic label. In other embodiments, the output oligonucleotide can generate da detectable signal by interacting with a naturally-occurring nucleic acid, thereby detectably repressing activity of the naturally-occurring nucleic acid.

In some embodiments, the input oligonucleotide can have right-handed (D) chirality. In other embodiments, the input oligonucleotide can have left-handed (L) chirality.

In another aspect, this disclosure describes a method of detecting presence of a target oligonucleotide. Generally, the method includes contacting the target oligonucleotide with a first translator that includes a domain that binds to the target oligonucleotide and has the same chirality as the target oligonucleotide. The first translator further includes a translation domain having chirality opposite that of the target oligonucleotide and the binding domain of the first translator. The method then includes allowing strand displacement between the target oligonucleotide and the heterochiral first translator to produce a heterochiral intermediate oligonucleotide that includes the translation domain. Next, the method includes allowing the intermediate oligonucleotide to contact a second translator that includes a nucleotide sequence, at least a portion of which is complementary to, and has the same chirality as, the translation domain of the heterochiral first translator. The method then includes allowing strand displacement between the intermediate oligonucleotide and the second translator to produce an output oligonucleotide, at least a portion of which has chirality opposite that of the target oligonucleotide. The output oligonucleotide generally includes, or generates, a detectable signal. Next, the method includes detecting the detectable signal, indicating presence of the target oligonucleotide.

In some embodiments, the detectable signal is a label that is a component of the output oligonucleotide. In some of these embodiments, the detectable signal can be a colorimetric label, a fluorescent label, a radioactive label, or a magnetic label. In other embodiments, the detectable signal may be a detectable biological activity generated by the output oligonucleotide. In some of these embodiments, the detectable biological activity can include the output oligonucleotide interacting with a naturally-occurring nucleic acid, thereby detectably repressing activity of the naturally-occurring nucleic acid.

In some embodiments, the input oligonucleotide can have right-handed (D) chirality. In other embodiments, the input oligonucleotide can have left-handed (L) chirality.

In some embodiments, heterochiral molecular circuit can include a plurality of simpler heterochiral molecular subcircuits arranged in series and/or in parallel. In some of these embodiments, a feeder circuit may generate an output oligonucleotide that acts as the input oligonucleotide for one or more subsequent circuits that generate a detectable signal. In some embodiments, a plurality of feeder circuits may produce an output oligonucleotide that acts, either alone or in combination with other output oligonucleotides from other feeder circuits, as the input oligonucleotide for a subsequent circuit that generates a detectable signal.

The above summary is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION OF ILLUSTRATIVE EMBODIMENTS

Figure 1:
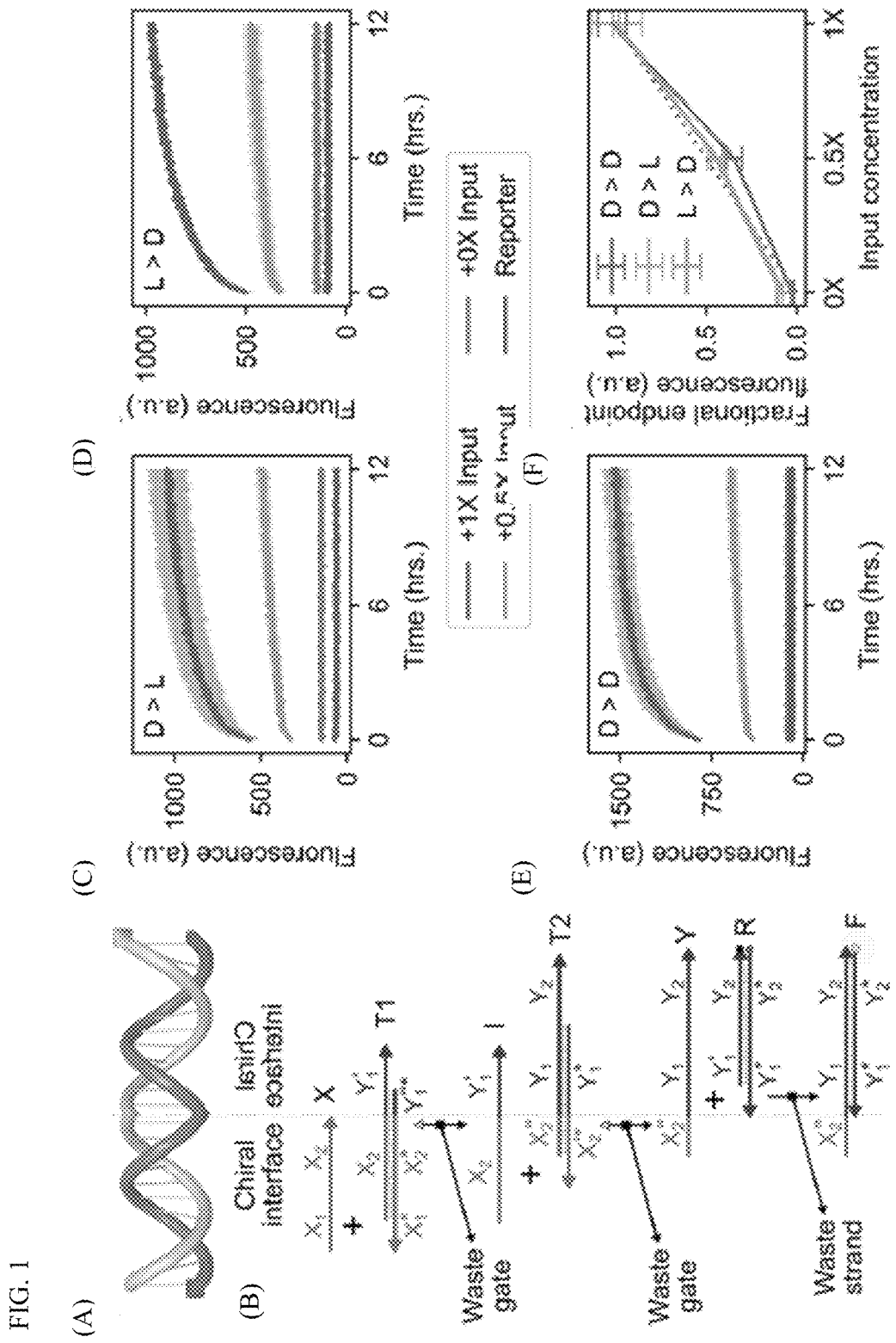
FIG. 1. Heterochiral translator architecture and operation. (A) Schematic illustration of a hybrid chiral duplex. (B) The heterochiral translator architecture involves a two-step translation process in which an input oligonucleotide (X) is converted to an output oligonucleotide (Y) of the opposite chirality, either D-DNA to L-DNA or vice versa. The translation is mediated by translator complexes (T1 and T2) and the output is sensed by a strand displacement reporter probe (R) of the same chirality as Y. Domain lengths: $X_1$: 5 nt, $X_2$: 25 nt, $X'_2$: 15 nt, X": 10 nt, Y: 20 nt, Y': 15 nt, Y": 5 nt, Y: 27 nt. (C) Fluorescence time course of signal translation in heterochiral translators from D-DNA input to L-DNA output (D>L). (D) Fluorescence time course of signal translation in heterochiral translators from L-DNA input to D-DNA output (L>D). (E) Fluorescence time course of signal translation in heterochiral translators from D-DNA translator (D>D) is included as a control. Reporter and gates are at concentrations of 300 nM and 1× input (300 nM) is supplied. Plot shows mean and standard deviation of three replicates. (F) Fractional endpoint fluorescence of kinetic assay for 0×, 0.5×, and 1× signal demonstrating linearity of signal translation relative to the maximum signal in each case. Plot shows mean and standard deviation of three replicates. The dotted line indicates a 1:1 input:output ratio. Reporter and gates are at concentrations of 300 nM which is also the 1× input concentration.

DNA strand displacement is a powerful chemical framework for implementing enzyme-free molecular circuits. For example, DNA strand displacement can sense biomarkers in cells and make diagnostic or therapeutic decisions in vivo. However, one issue preventing the application of these systems in cells is the degradation of the circuit components by nucleases.

This disclosure addresses the challenge of implementing bioorthogonal molecular biosensing systems by exploiting a parameter that is typically neglected when designing DNA nanodevices—the chirality of the DNA molecule. The chirality of naturally occurring, "right-handed" nucleic acids (henceforth referred to as D-nucleic acids), plays a significant role in their recognition by naturally occurring nucleases. Left-handed nucleic acids (henceforth referred to as L-nucleic acids) have not been discovered in living systems. The chirality of DNA offers a route to build hardware for nucleic acid computing devices that are known to be highly resistant to interference from all biological processes, by constructing them from L-DNA strands instead of the standard D-DNA. Thus, this disclosure describes heterochiral molecular circuits that employ L-nucleic acids, the chiral mirror images of naturally occurring D-nucleic acids, as alternative materials for constructing nucleic acid circuits.

A heterochiral molecular circuit is of little practical use unless it can interface with naturally occurring biomolecules and biological systems. Thus, the heterochiral molecular circuits described herein include heterochiral input/output (I/O) interfaces to serve as programmed points of interaction between standard D-DNA input oligonucleotides and L-DNA output oligonucleotides. Bioorthogonal L-DNA molecular computers and naturally occurring systems. The heterochiral molecular circuits described herein can, for example, sense inputs from the cellular environment, carry out some internal computation using their bioorthogonal heterochiral DNA chemistry, and then generate an output oligonucleotide from that computation. The output oligonucleotide can, in some cases, include a detectable signal. In such applications, the heterochiral molecular circuit system described herein can sense its environment, compute, and signal the result of that computation.

The detectable signal can include, but is not limited to, a detectable label that is a component of the output oligonucleotide. Exemplary detectable labels include, but are not limited to, a colorimetric label, a fluorescent label, a radioactive label, or a magnetic label. Such systems can be designed for, but not limited to, biosensing and/or biomedical diagnostic applications. In other cases, the detectable signal can be a detectable biological activity generated by the output oligonucleotide. For example, a heterochiral molecular circuit whose output has biological activity can include those translating an L-DNA input to a D-DNA or D-RNA output, producing a D-nucleic acid that can interact directly with biological systems, e.g., as antisense oligonucleotides that bind directly to complementary D-nucleic acids (primarily, to D-RNAs). However, heterochiral molecular circuits that translate a D-DNA input to an L-nucleic acid output could also have biological activity. For example, L-nucleic acid aptamers have been isolated against naturally occurring D-nucleic acids from biological systems.

The heterochiral molecular circuits described herein generally include at least three distinct components: a first component, capable of sensing, receiving, or otherwise responding to an input; a second component capable of performing a particular calculation or task based on the initial interaction with the input; and a third component, capable of producing an output. In general, the first and third components involve some interaction with the cellular environment while the second component is, in some embodiments, bioorthogonal—i.e., it is neither affected by nor affects the cellular environment.

This disclosure describes an alternative design for chimeric L-DNA/D-DNA signal translators with enhanced robustness. The signal translators use a heterochiral variant of strand displacement gates. The heterochiral variants have structure that makes the system more robust to non-specific generation of output signal ("leak") in the absence of inputs: even if the D-DNA components of the circuit are degraded, the output signal remains low. The system described herein is thus more robust in the sense that it will "fail safe" when the D-DNA components are degraded. This disclosure further demonstrates that a TMSD reaction will proceed across the interface between the L-DNA and D-DNA duplexes in a hybrid chimeric molecule (FIG. 1A). Thus, this disclosure not only demonstrates a new design paradigm in heterochiral molecular computing, but also offers enhanced robustness guarantees that make the circuits more applicable for practical biomedical applications.

In one exemplary embodiment, the heterochiral molecular circuit described herein can respond to a nucleic acid input (either D-DNA or D-RNA), using synthetic devices built from hybrid diblock copolymers that contain both L-DNA and D-DNA monomers. This provides a novel mechanism for engineering hybrid, heterochiral molecules that can interface directly with naturally occurring D-nucleic acids through a D-DNA "input binding domain" that participates in Watson-Crick hybridization with the D-DNA input oligonucleotide. The L-DNA "translation" domain confers resistance to cellular mechanisms. Furthermore, the heterochiral circuit design described herein can also be configured with the opposite chirality, that is, to respond to an L-DNA or L-RNA input and convert that into a D-DNA or D-RNA output via a similar mechanism.

The heterochiral signal translation system is robust to nuclease degradation of the D-DNA domains because the input signal (X) is an ssDNA of one chirality but the output is an ssDNA of the opposite chirality, variously illustrated in FIG. 1B, FIG. 6A, FIG. 7B, and FIG. 13. FIG. 1B illustrates an exemplary signal translation system involves a two-step process that employs two toehold-mediated strand displacement (TMSD) gates (T1 and T2), in which the first gate (T1) translates the input strand to an intermediate (I) whose displacement domain is partly of one chirality and partly of the opposite chirality. The translation process is completed by the second gate (T2). The resulting output signal, (Y), whose displacement domain is of the opposite chirality to that of the input signal, (X), is sensed by a FRET-based TMSD probe (R).

This design involves one of the TMSD reactions proceeding across the interface between the D-DNA and L-DNA duplexes in the T2 gate. Such a cross-chiral TMSD reaction has not been previously demonstrated. Three versions of the translator system were prepared: one in which an L-DNA input is translated into a D-DNA output (L>D), one in which a D-DNA input is translated into an L-DNA output (D>L), and a homochiral control in which a D-DNA input is translated into a D-DNA output (D>D). Raw fluorescence results of kinetic tests of this system are shown in FIG. 1C-E. While the behavior is qualitatively similar, the absolute fluorescence values are different. These differences could be attributable to chemical differences between the reporters, stoichiometry errors in gate or circuit preparation, or inefficiency in the cross-chiral strand displacement reaction itself. However, the endpoint fluorescence in each case is linear in the input, as shown in FIG. 1F. Altogether, these show that the two heterochiral systems perform similarly to the D>D system.

Figure 3:
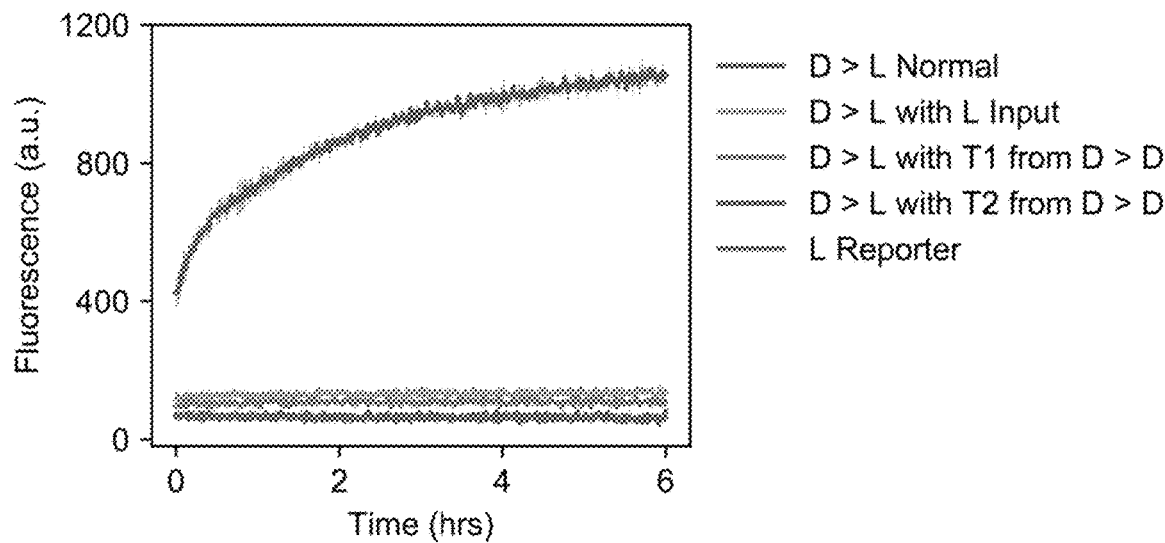
FIG. 3. Kinetic time courses of chiral specificity controls for heterochiral translators. (A) Demonstration of chiral specificity of components in the D>L heterochiral translator. Mirroring the chirality of the input or replacing one of the translator gates (T1 or T2) with the homochiral version from the D>D translator suffices to reduce circuit output to background levels, thereby demonstrating chiral specificity of the translator architecture. (B) Similar demonstration of chiral specificity of components in the L>D heterochiral translator. Each plot shows mean and standard deviation of three replicates. Concentrations of all gates, 1× input, and reporter are 300 nM.
Figure 3:
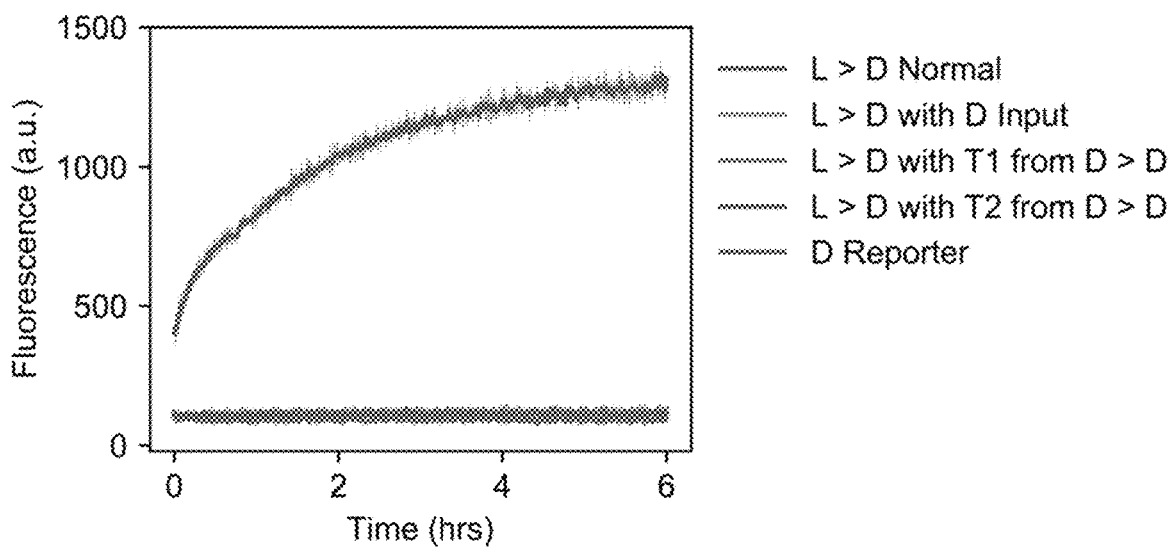
Figure 4:
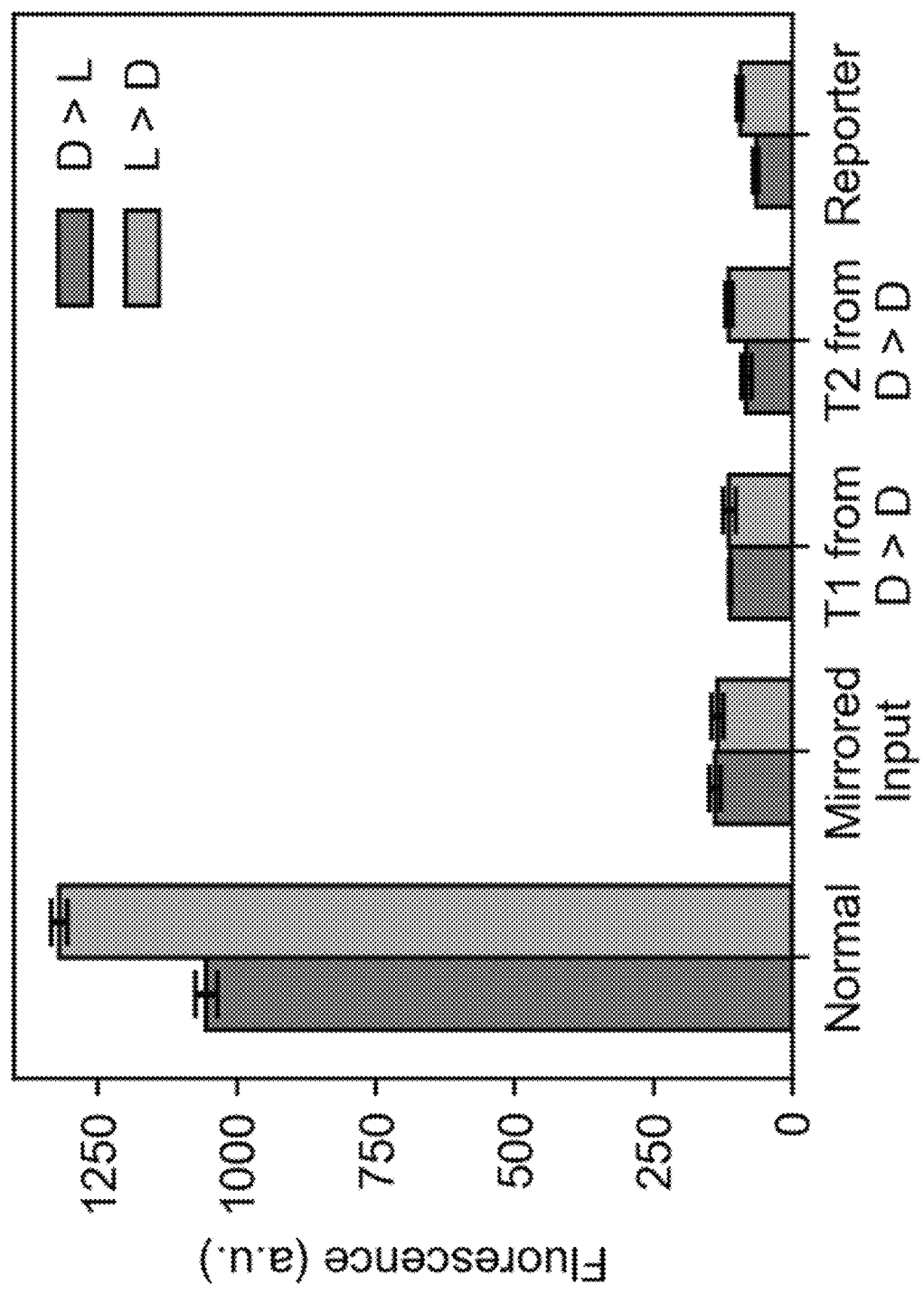
FIG. 4. Endpoint comparison of chirality controls for D>L and L>D heterochiral translators. Endpoint values from FIG. 3 are plotted for comparison. In all cases, mirroring the chirality of the input or replacing one of the translator gates (T1 or T2) with the homochiral version from the D>D translator suffices to reduce circuit output to background levels, thereby demonstrating chirality specificity of our translator architecture. Plot shows mean and standard deviation of three replicates. Concentrations of all gates, 1× input, and reporter are 300 nM.

The chiral specificity of the system was demonstrated by switching out various gates in the cascade for their D>D counterparts and observing that the resulting signal was not significantly above background (FIG. 3 and FIG. 4). These results show that not only can individual signals be translated between L-DNA and D-DNA via TMSD, but also that individual TMSD reactions can successfully cross the chiral interface. This is the first time that such TMSD reactions have been reported, and therefore significantly broadens the design space for heterochiral TMSD systems.

Figure 5:
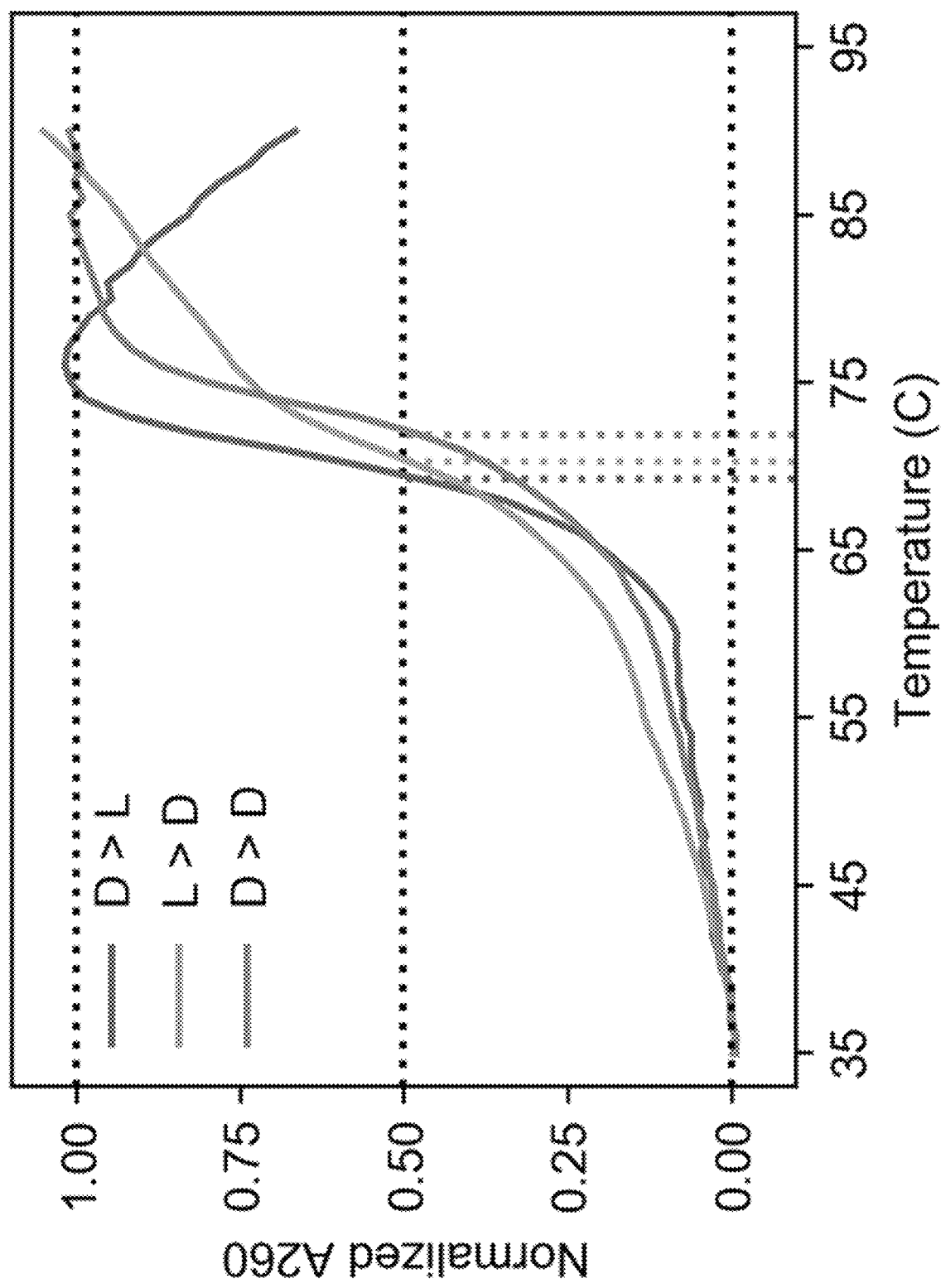
FIG. 5. UV-vis experiments to measure melt curves for heterochiral and homochiral translators. The calculated half-max values are shown by vertical lines and are as follows: D>L=69.27° C., L>D=70.31° C., D>D=71.91° C. This suggests a small lowering of the melting temperature caused by the presence of a chiral crossover in the molecule, although the difference is not significant. Samples were prepared at 3 μM, and A260 readings were normalized, as outlined above. The drop in the absorbance signal at the high end of the D>L trace could be caused by evaporation of the sample during heating.
Figure 6:
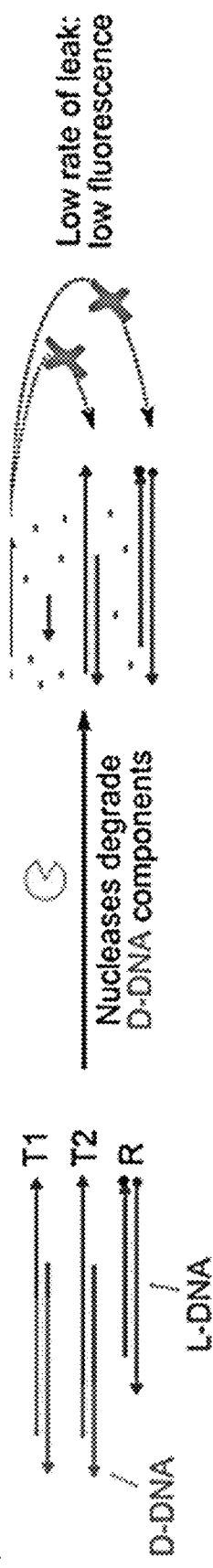
FIG. 6. Schematic illustrations showing the effects of nuclease degradation on heterochiral translators when incubated in serum. (A) In a D>L heterochiral translator system, the upstream (input-sensing) domains may be degraded by nucleases. The reporter gate remains intact and the remains of the other gates can only activate the reporter via blunt end strand displacement reactions, which have a low rate constant. Hence the observed level of fluorescence should be low. (B) In an L>D heterochiral translator system, the downstream (output-signaling) domains and the reporter itself may be degraded by nucleases. Thus, degraded T1 and T2 gates may more readily activate the reporter, and the reporter itself may be directly degraded. Hence the observed level of fluorescence should be high. (C) In a D>D homochiral translator system (control), both the upstream (input-sensing) and downstream (output-signaling) domains and the reporter itself may be degraded by nucleases. Thus, degraded T1 and T2 gates may more readily activate the reporter, and the reporter itself may be directly degraded. Hence the observed level of fluorescence should be high.
Figure 6:
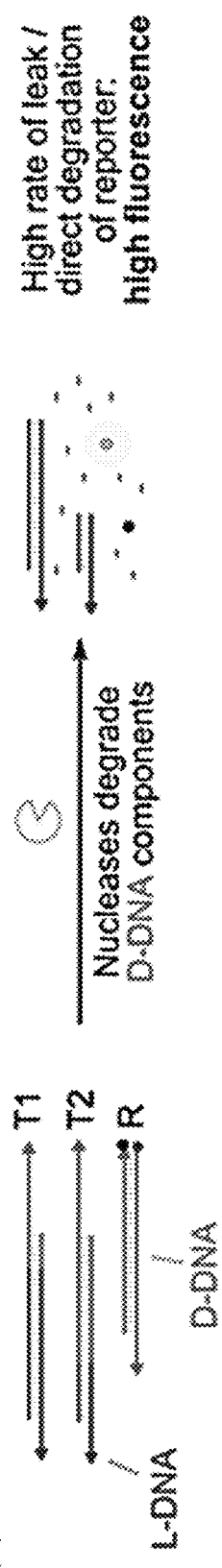
Figure 6:
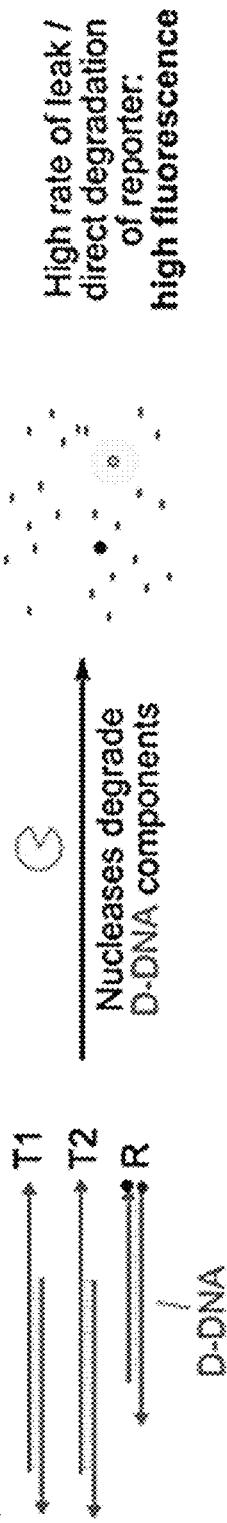

In theory, the presence of a chiral interface partway along the duplex might destabilize the complex by disrupting base stacking. Therefore, UV-vis spectroscopy was used to determine the melt curves of the three T1 gates. No significant difference between the heterochiral and homochiral versions was detected (FIG. 5). This may be because the duplexes are relatively long (30 bp), so the local disruption at the chiral interface may have a smaller effect than if the duplexes were shorter in length.

Figure 2:
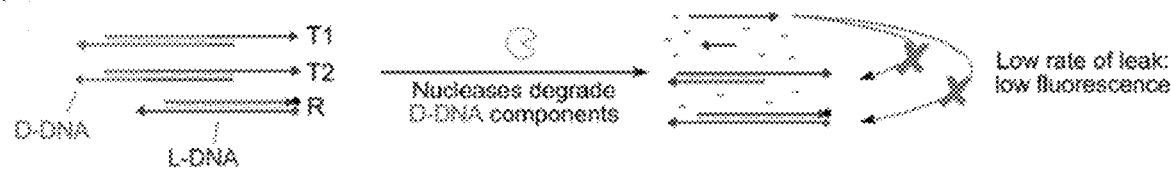
FIG. 2. Robustness of heterochiral translators in serum. (A) Schematic illustration of the degradation of D>L heterochiral translator in serum. The translator design means that, even if the upstream D-DNA domains are fully degraded, the only reaction that can proceed is a blunt end strand displacement reaction, which has a low rate constant and, therefore, a low rate of leak should be observed. (B) Incubation of D>D and heterochiral D>L translators in 10% serum for six hours, at which point circuits are triggered with 10× input. Even without any protection of the D-DNA domains via chemical modifications, far lower leak is observed in the heterochiral D>L circuit than the control D>D system. Plot shows mean and standard deviation of three replicates. (C) Demonstration of longer-term stability of heterochiral D>L translator in 10% serum over 26 hours. Even after this long incubation, minimal leak is observed. Plot shows mean and standard deviation of three replicates. If triggered with input, circuit response in the heterochiral D>L circuit is low because the D-DNA domains that sense the input have likely been degraded (data not shown). Standard concentrations of 300 nM were used throughout.
Figure 2:
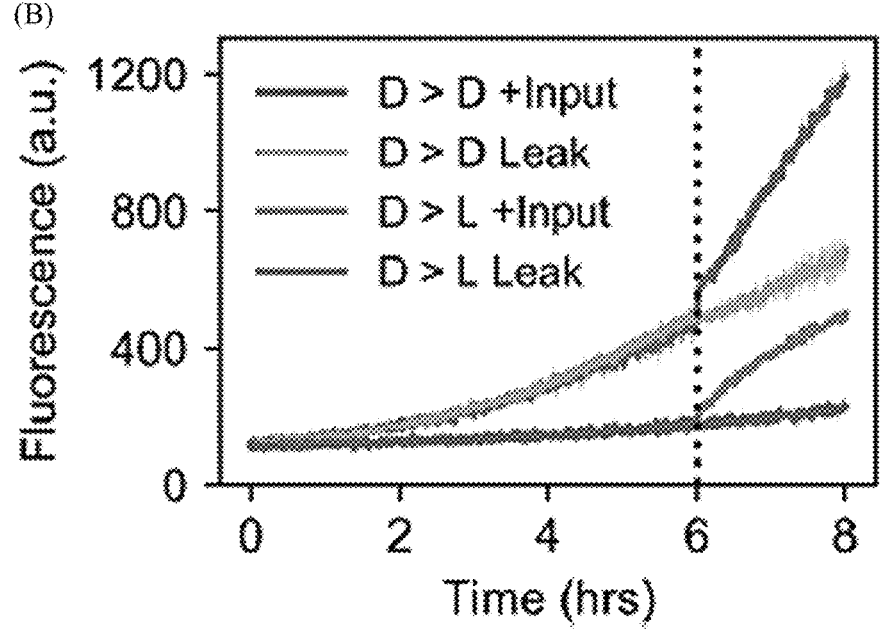
Figure 2:
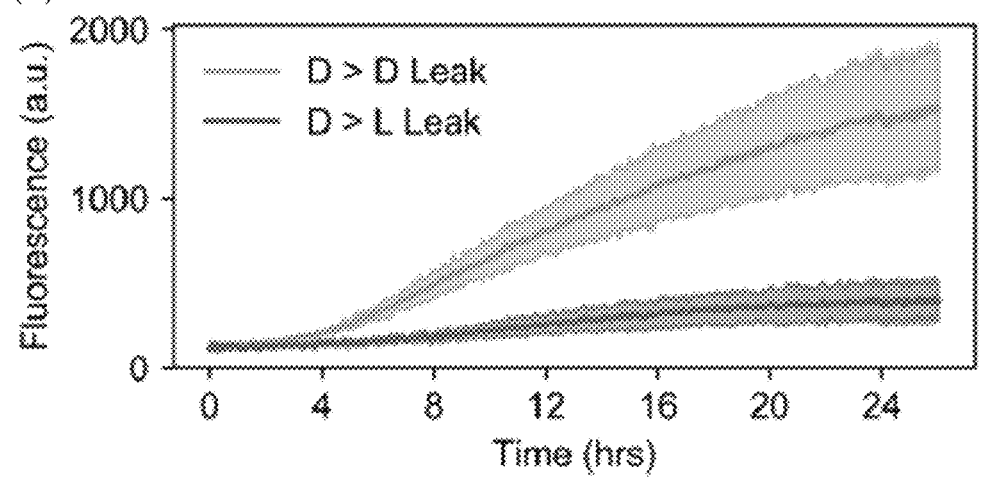

D-DNA molecular circuits and the D-DNA components of heterochiral duplexes are degraded in biological fluids unless further chemical modifications (e.g., locked nucleic acids or 2' O-methyl D-ribonucleotides) are used. The two-step nature of the D>L translator mitigates without having to modify D-DNA components because degradation of the D-DNA should not produce structures that can undergo TMSD. The D>L translator system was incubated in serum-supplemented media (DMEM with 10% FBS) for six hours and then triggering the translator by spiking in the D-DNA input. Minimal leak was observed over six hours, followed by an increase in fluorescence as the input activated those gates with D-DNA domains still intact (FIG. 2B). To demonstrate long-term survival, D>D and D>L translators also were incubated for 26 hours and observed far lower leak in the D>L system than the D>D system (FIG. 2C). This demonstrates that translators can detect D-nucleic acids in serum with minimal additional chemical modifications, and that they generate minimal false positive signals even when their D-DNA domains are degraded.

This, this disclosure demonstrates robust signal translation between D-DNA and L-DNA using a multi-step heterochiral translator architecture. The data provided herein demonstrate that TMSD reactions can proceed across the chiral interface in an L-DNA/D-DNA hybrid duplex, both from D-DNA to L-DNA and vice versa. The chiral interface has minimal effect on the stability of the gates themselves. Finally, the circuit architecture of the D>L translators are robust against leak caused by degradation of the D-DNA components in biological fluids without chemical modification of the D-DNA. The system described herein can broaden the design space and future applications of heterochiral DNA strand displacement systems, including for in vivo deployment for tasks such as intracellular imaging and detection of biomarkers such as microRNAs.

One exemplary application for the heterochiral molecular circuits described herein is nanoscale integrated sensing and information processing. One advantage of molecular computing in this context is that the presence or absence of multiple target molecules, such as biomarkers indicative of a diseased cell state, can be detected via their interactions with biosensor modules. These detection signals can then be processed by the molecular computing machinery to produce a single, combined output signal that represents a diagnostic decision of the system, which can then be linked to an output such as the release of a drug molecule. Thus, molecular computing has the potential to provide significant additional power and flexibility beyond that offered by biosensing systems that rely on detecting a single target analyte.

However, one challenge for deploying programmable, nucleic acid-based molecular devices for in vivo biomedical applications is their potential to interact with the intracellular environment though mechanisms including, but not limited to, degradation by nucleases, immunomodulation, etc.

One reason why many conventional DNA circuit components are not bioorthogonal is that they are constructed from commercially available DNA oligomers that are related to naturally occurring DNA and are thus recognized and processed by naturally occurring protein enzymes or recognition elements. While a limited degree of bioorthogonality can be conferred by chemical modifications to the backbone chemistry of the DNA strands (e.g., by replacing phosphodiester linkages with phosphorothioate linkages), undesired interactions between circuit components and the biochemical environment still occur (See, e.g., Groves et al., 2016, *Nature Nanotechnology* 11:287-294).

In addition to biosensing, the techniques described herein are applicable in other situations where detection of the chemical environment is of interest and where one may desire robust sensor components. Similar approaches could be developed using aptamers or other input sensing modalities that feed into a robust heterochiral molecular computing system implemented with L-DNA components. For example, environmental sensing applications (e.g., to detect water contaminants) could be another viable application of this technology.

Figure 7:
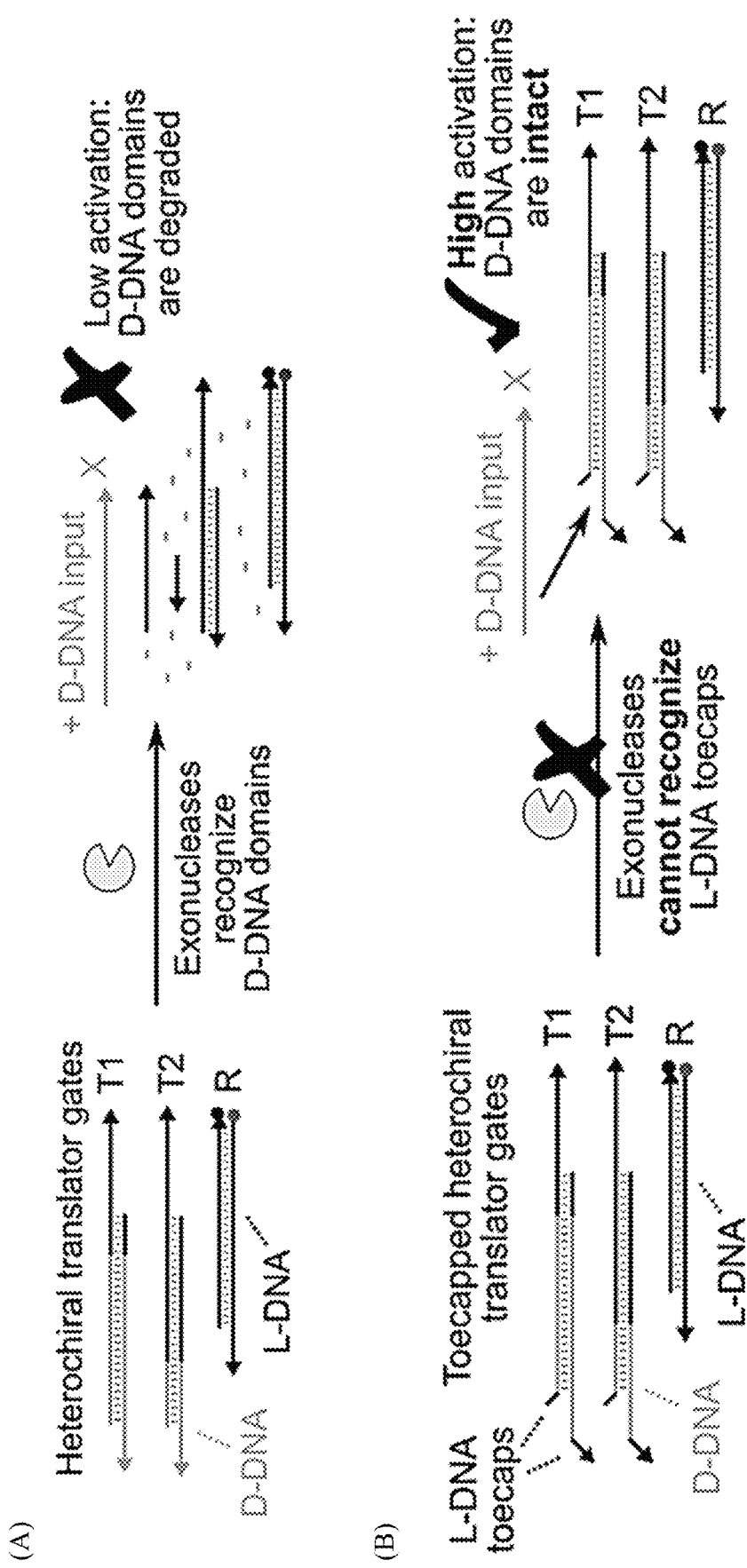
FIG. 7. Schematic illustrations showing L-DNA "toecaps" that interfere with exonuclease degradation of D-nucleic acids. (A) In the absence of "toecaps", the D-DNA regions of circuit components are subject to degradation by exonucleases. This can weaken responses to the cognate D-DNA strand. (B) With L-DNA "toecaps" at the D-DNA strand termini, a lower rate of exonuclease degradation is observed. The L-DNA "toecaps" thereby enhance responses when the gate is activated by the cognate D-DNA input strand.

A consideration when producing heterochiral molecular computing devices that are robust to degradation in biological systems is to design the devices so that the D-DNA components are less susceptible to degradation by cellular defenses such as exonuclease enzymes. Based on the observation that exonucleases can only recognize exposed D-DNA strand termini, these D-DNA portion may be modified to include an L-DNA "toecap." As illustrated in FIG. 7, these short, non-interacting L-DNA segments are used to remove all exposed D-DNA strand termini in the system by capping them with L-DNA. The goal of this modification is to reduce the rate of degradation of components by exonucleases while preserving the D-DNA portions needed for the system to interact with naturally occurring D-nucleic acids, either as circuit inputs or as circuit outputs.

The exemplary system illustrated in FIG. 7 consumes a D-DNA input strand and releases an L-DNA output strand via a multi-step strand displacement cascade that includes two toehold-mediated strand displacement reactions, the second of which traverses the chiral interface between D-DNA and L-DNA. A third L-DNA strand displacement reaction activates a FRET reporter probe by displacing its quencher. The D-DNA domains are responsible for sensing D-DNA input in this system, and modifying these strand termini with L-DNA toecaps enables this system to remain responsive to its input even after extended incubation in serum-supplemented media, even without any additional modifications to the D-DNA regions (e.g., locked nucleic acids (LNA), phosphorothioate backbone linkages, or 2' O-methyl ribonucleotides). Furthermore, the kinetics of L-DNA branch migration reactions are similar to the corresponding D-DNA reactions, which is not the case for alternative systems using LNA or heterochiral systems that incorporate peptide nucleic acid (PNA) components.

Figure 8:
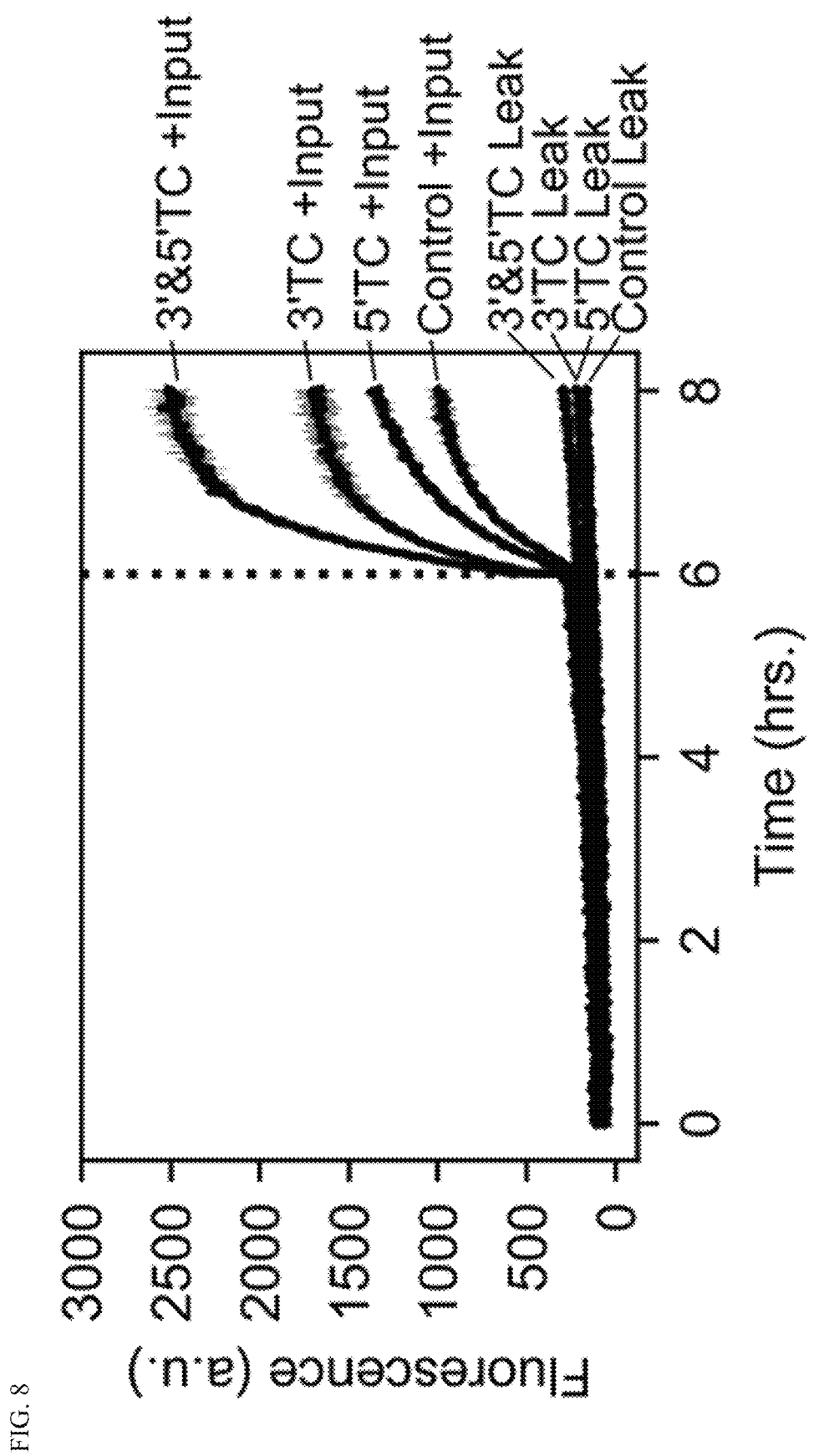
FIG. 8. Background-subtracted kinetic data showing that the presence of toecaps improves signal output from D>L translators in the presence of 10× input relative to the gate concentrations. The improved signal output is due to reduced exonuclease degradation of D-DNA domains due to the presence of L-DNA toecaps. Adding both 3' and 5' toecaps (3'&5'TC+input) produces more signal than 3' toecaps (3'TC+input) alone. Each trace was subtracted by the average of the trace for the corresponding reporter alone.
Figure 9:
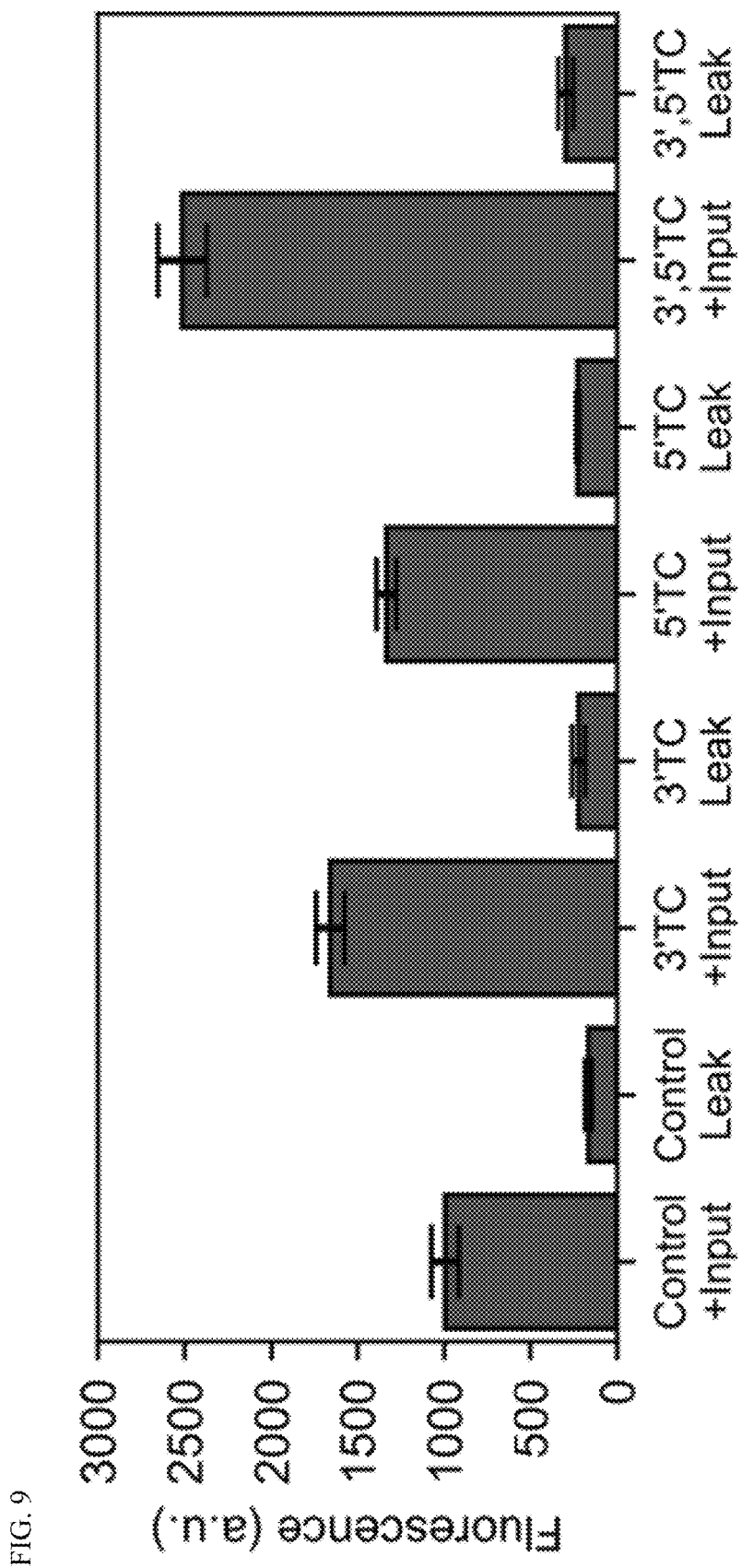
FIG. 9. Bar graph representation of the background-subtracted endpoint data from the kinetic read data from FIG. 8.
Figure 10:
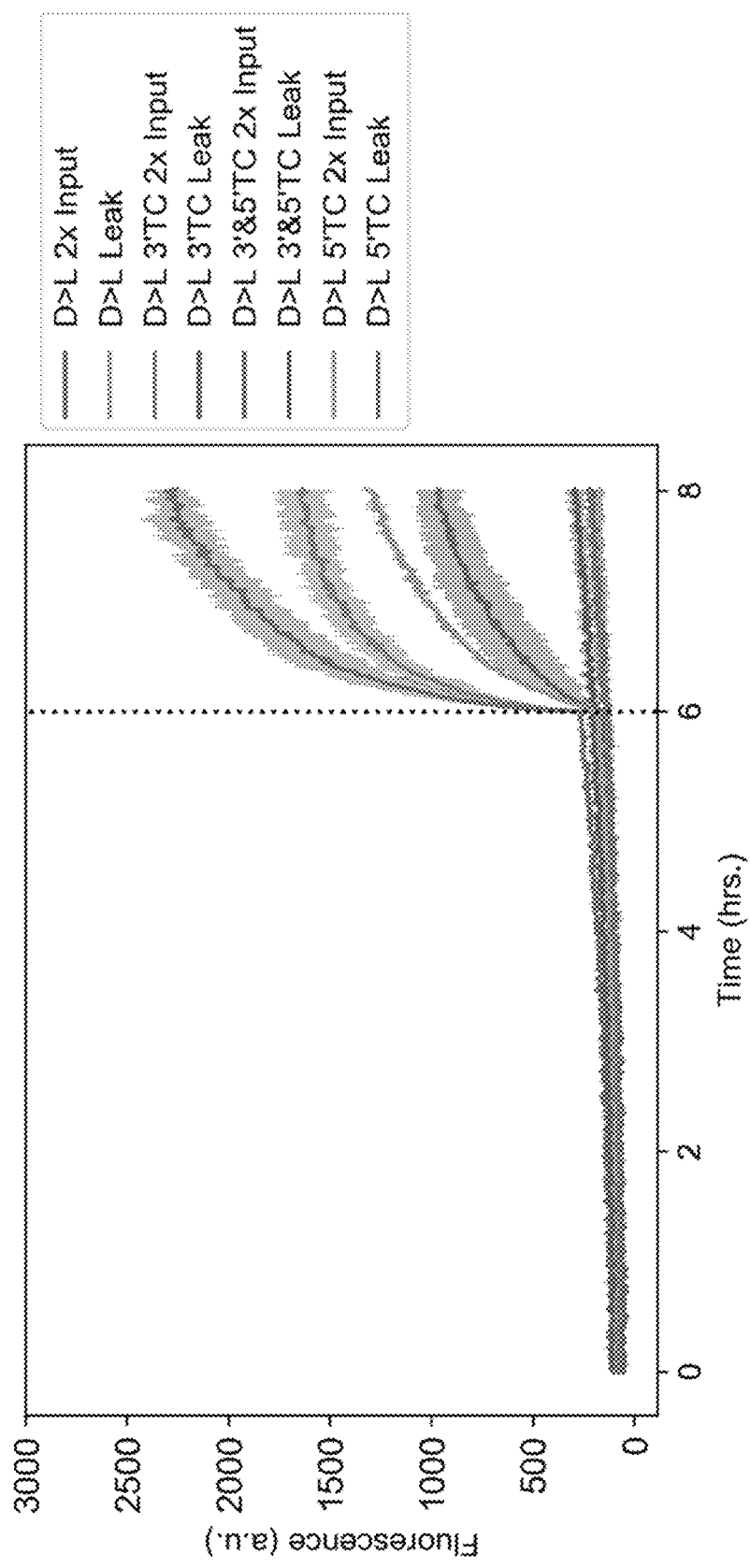
FIG. 10. Background-subtracted kinetic data showing that the presence of toecaps improves signal output from D>L translators in the presence of 2× input relative to the gate concentrations. The improved signal output is due to L-DNA toecaps reducing the extent to which exonucleases are able to degrade D-DNA domains. The addition of both 3' and 5' toecaps (3'&5'TC 2× input, top tracing) produces more signal than 3' toecaps (3'TC 2× input, second tracing from the top) alone. Each trace was subtracted by the average of the trace for the corresponding reporter alone.
Figure 11:
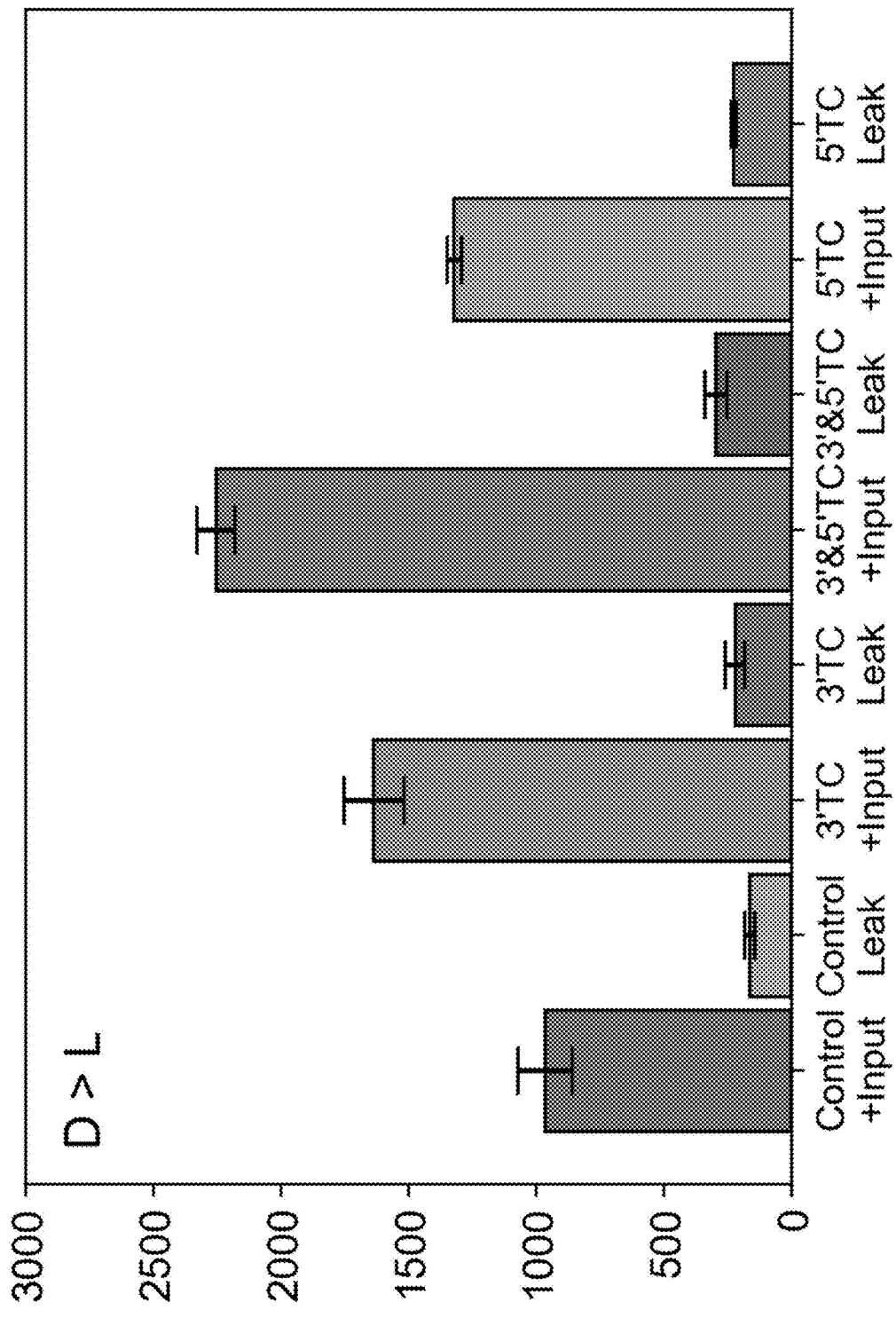
FIG. 11. Background-subtracted endpoint data from the kinetic read data from FIG. 10.

Experimental data validating this system design is shown in FIG. 8 and FIG. 9. Several variants of the D>L heterochiral translator were incubated in media supplemented with 10% fetal bovine serum for six hours, at which point the circuit was activated by adding a 10× excess of the corresponding D-DNA input strand. The system was observed for an additional two hours (FIG. 8, hours 6-8). Leak was low and identical in all cases. The systems with toecaps, however, exhibited a stronger signal response than the control system when activated by the input. Poly-T (TTTTT) L-DNA toecaps were provided on 3' D-DNA strand terminus (3'TC+input), the 5' D-DNA strand terminus (5'TC +input), or both 3' and 5' D-DNA strand termini (3'&5'TC+input). The 3' toecaps provided a stronger response than the 5' toecaps, which is consistent with most exonucleases operating in the 3'-to-5' direction, recognizing the 3' strand terminus as their target. Dual toecaps (both 5' and 3') provided the strongest signal response. Similar results were obtained using just 2× of the D-DNA input (FIG. 10 and FIG. 11).

Figure 12:
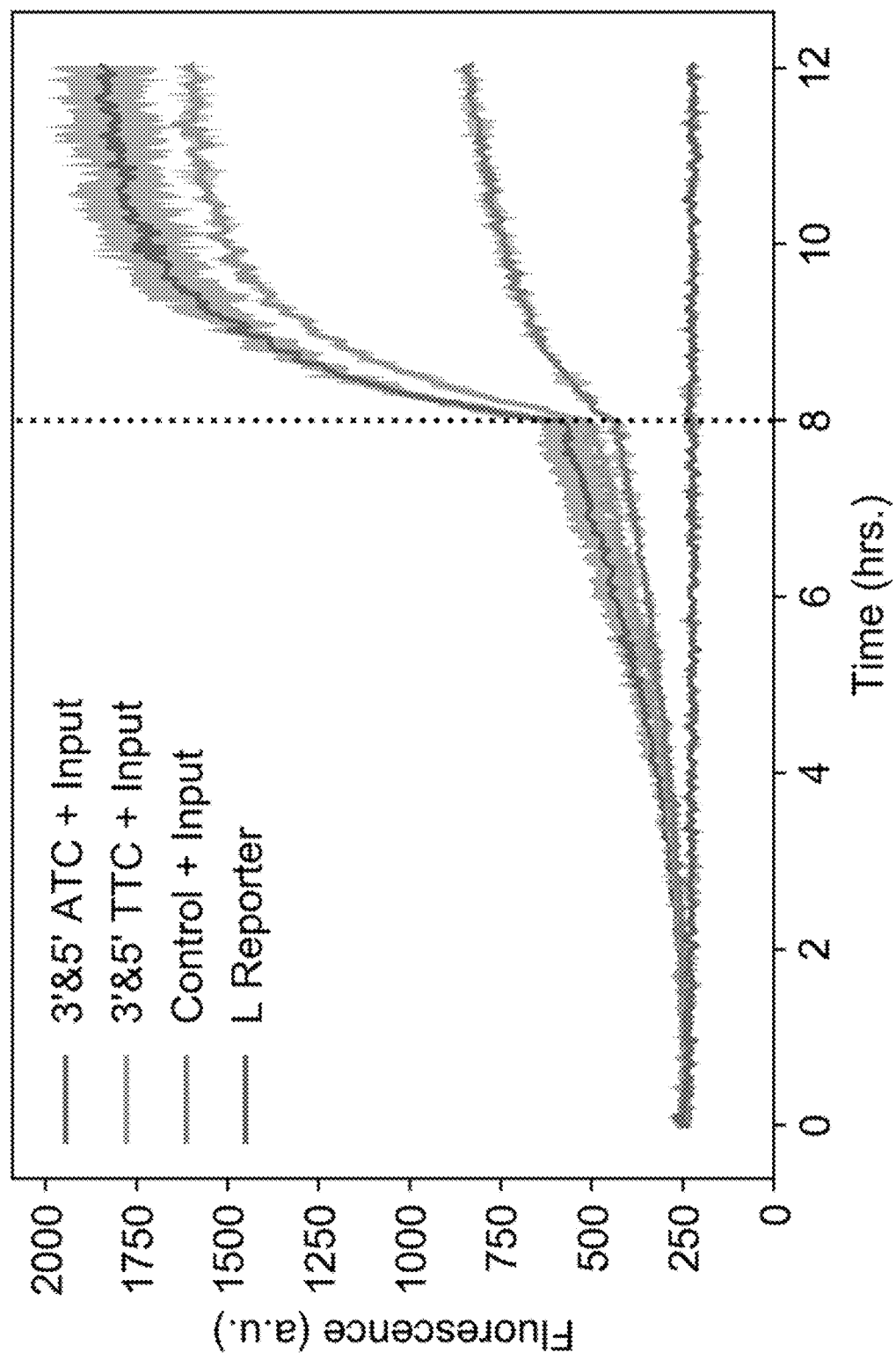
FIG. 12. Incubation of D>L leakless translators with toecaps in 10% fetal bovine serum for eight hours, at which point circuits are triggered with 2× input. Gates and reporter are at 300 nM which is considered 1×. The poly-A toecap (top tracing) shows a similar response to the input as the system with a poly-T toecap (second tracing from the top). Both systems are significantly more responsive than the non-toecapped D>L leakless translator system (Control; second tracing from the bottom).

To demonstrate that the toecapping effect is not sequence-specific, a similar system was constructed using poly-A (AAAAA) L-DNA toecaps, which behaved almost identically to the poly-T version, as shown in FIG. 12. These results suggest a simple design rule for enhancing the robustness of heterochiral DNA devices: simply toecap all D-DNA strand termini on gate complexes with short L-DNA domains.

Figure 13:
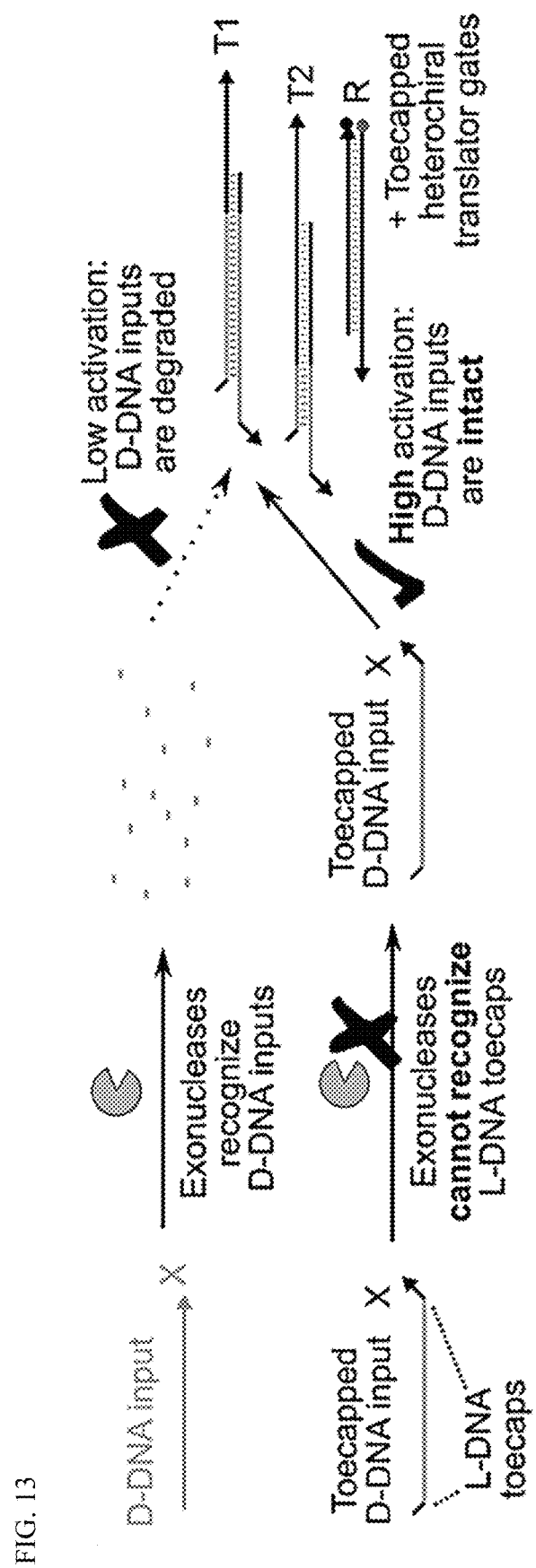
FIG. 13. L-DNA toecaps interfere with exonuclease-mediated degradation of single-stranded D-DNA oligonucleotides. (Top) Non-toecapped D-DNA input strands are degraded by exonucleases on incubation in serum-supplemented media, which results in low activation when the incubated strands are used to activate a toecapped heterochiral translator system. (Bottom) Adding L-DNA toecaps reduces the rate of recognition by exonucleases, enabling higher levels of activation of the strand displacement gates upon addition.
Figure 14:
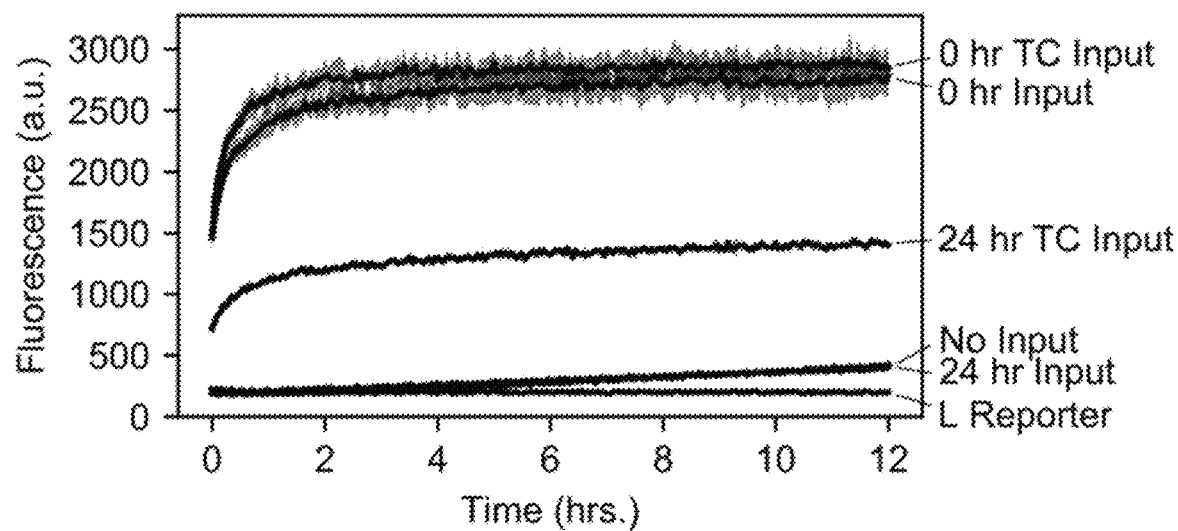
FIG. 14. L-DNA toecaps interfere with exonuclease-mediated degradation of single-stranded D-DNA oligonucleotides. (A) Kinetic traces of selected input incubations comparing the effectiveness of a L-DNA toecapped input (TC Input) to a fully D-DNA input (Input). (B) Background removed endpoint fluorescence of five different input incubation lengths ranging from 0 hour (i.e., not incubated) to 24-hour incubation.
Figure 14:
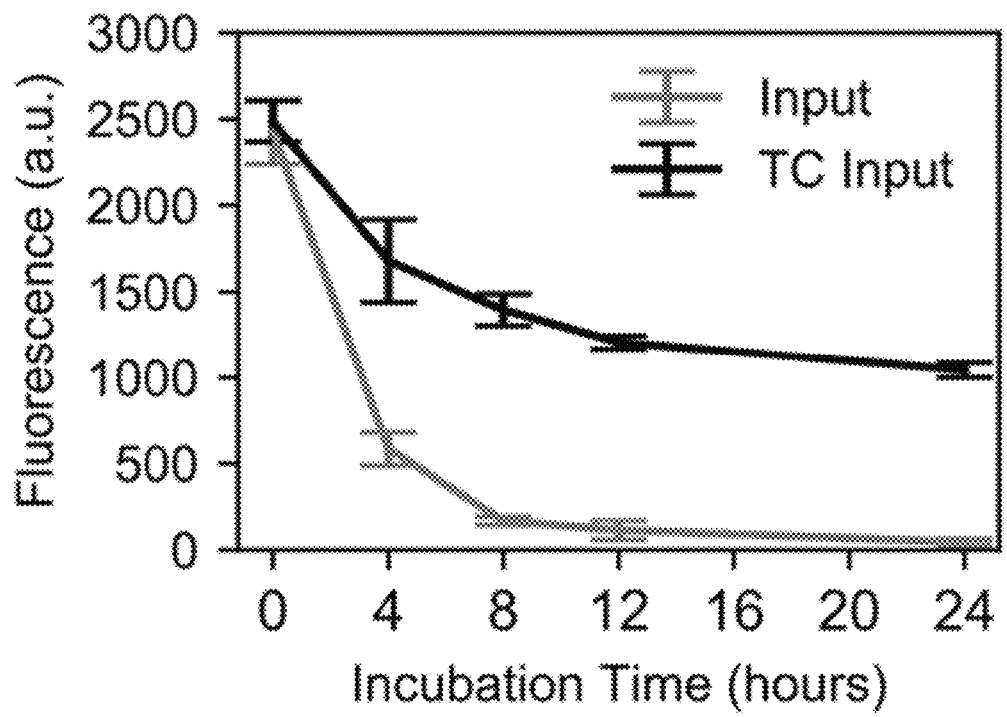

Next, a similar approach was tested in which single-stranded D-DNA oligomers were toecapped. Given that many multi-step DNA strand displacement circuit designs require auxiliary single-stranded "fuels" to drive the reaction forward, developing such a capability is important to enable the approach to be scaled up to larger circuits. FIG. 13 illustrates an exemplary system with a poly-A L-DNA "toecapped" version of the D-DNA oligonucleotide that serves as the input to the D>L heterochiral translator system. The toecapped and non-toecapped versions of this input were incubated for various lengths of time before transferring them into a reaction volume containing the heterochiral gates and L-DNA reporter probe. This experimental design allows one to assess the ability of the toecapped and non-toecapped inputs to activate the reaction cascade. The non-toecapped inputs are rapidly degraded in serum supplemented media. After only four hours of incubation the non-toecapped inputs lost over half of their ability to activate the circuit (FIG. 14B). Meanwhile, the toecapped inputs retained over 50% activation of the circuit even after 24 hours of incubation. These results demonstrate that the toecapping approach can be applied not just to D-DNA domains of strand displacement gate complexes, but also to single-stranded nucleic acids, which are common components of many DNA-based molecular computing devices.

Figure 15:
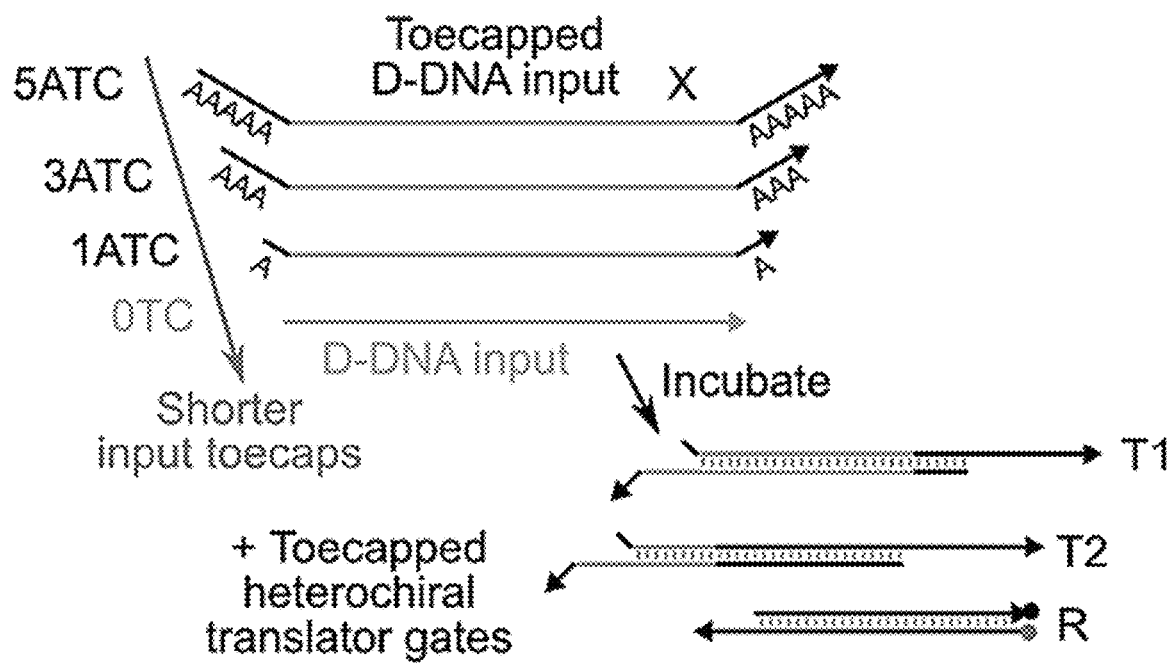
FIG. 15. Effect of decreasing toecap length on the extent to which L-DNA toecaps interfere with exonuclease degradation of single-stranded input oligonucleotides. (A) Schematic of X input strands with five nucleotide, three nucleotide, one nucleotide, and zero-length L-DNA poly-A toecaps. After incubation, toecapped heterochiral translator gates are added to measure integrity of input strands via their ability to initiate the programmed strand displacement cascade. (B) Normalized fluorescence of reaction endpoints after eight hours.
Figure 15:
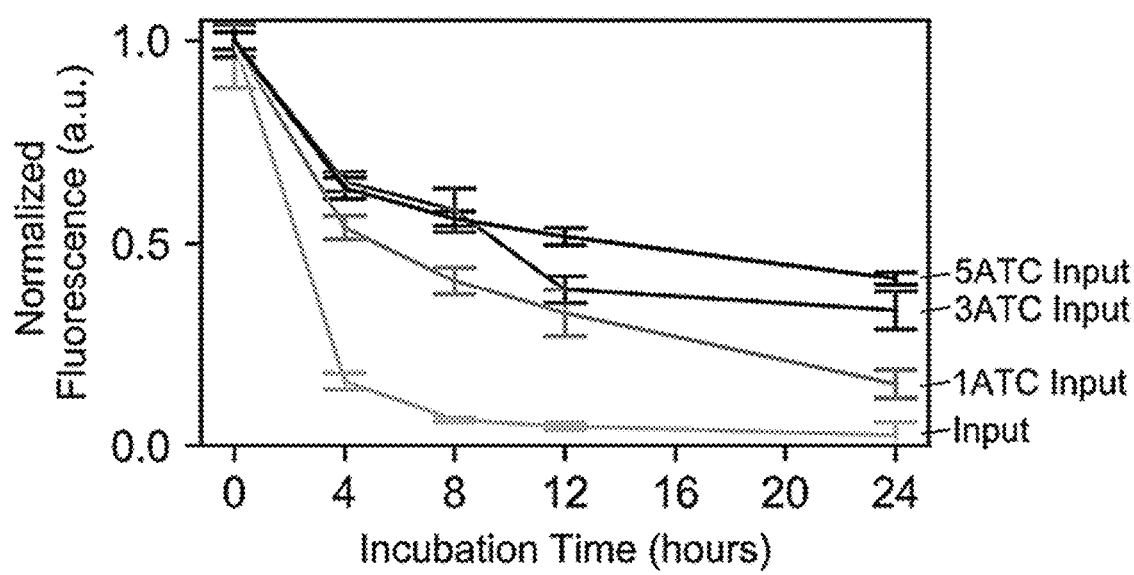

Finally, the extent to which the length of the toecap influenced the extent of circuit activation was tested. The length of the toecap for the initial designs was based on the toehold length. However, a shorter sequence of L-DNA would be simpler to synthesize and may have an advantage in more complex circuits that rely on different DNA structures. Additionally, shorter overhangs may enhance stability of the base-pairs at the ends of the duplex, which could help to reduce leak. In an expansion of the previously described experiment, input strands with a five nucleotide L-DNA poly-A toecap, a three nucleotide L-DNA poly-A toecap, a one nucleotide L-DNA poly-A toecap, or no toecap (0 length) L-DNA poly-A toecaps were incubated in serum supplemented media and tested for their ability to activate the reaction cascade (FIG. 15A). Activation of the circuit at 24 hours was greatest with the five nucleotide toecap and decreased with shorter toecap lengths. (FIG. 15B) The five-nucleotide toecap and three-nucleotide toecap performed similarly reducing degradation of the input for the first eight hours of incubation (FIG. 15B). This suggests that in certain applications a three nucleotide toecap might provide a good compromise between compactness of the toecap sequence and the ability to reduce exonuclease degradation. Even the single nucleotide L-DNA toecap showed significant activation compared to non-toecapped DNA. Thus, the system is tunable by adding only the length of toecap needed for the time the system is expected to be in the presence of exonucleases.

Thus, this disclosure describes adding L-DNA domains to "cap" D-DNA strand termini in heterochiral devices. The L-DNA toecaps can enhance the robustness of the heterochiral DNA devices to and reduce degradation by exonucleases present in model biological fluids such as serum-supplemented media. L-DNA toecaps are effective at reducing exonuclease degradation of both double-stranded D-DNA and single-stranded D-DNA. Moreover, the resistance to exonuclease degradation is not sequence specific, allowing for flexibility in applying this technique to future system designs. Combining L-DNA toecaps with other forms of chemical modification of D-DNA that are typically applied within the D-chirality (e.g., phosphorothioate/2' O-methyl RNA) can provide even stronger resistance to exonuclease degradation than for either modification alone. Future systems could also be tested with more biomedically relevant models such as transfecting into human cell lines. This design improvement will expand the useful computing time of DNA devices in biologically harsh environments paving the way for future biomedical implementations such as in vivo biomarker detection or cellular imaging.

While described herein in the context of exemplary circuits illustrated in, for example, FIG. 1A, FIG. 2A, FIG. 6, FIG. 7, and FIG. 13, toecapped oligonucleotides can be employed in more complex molecular circuits. For example, one can design a more complex circuit that includes more than one simple circuit connected in series. In such embodiments, the output oligonucleotide of one simple circuit can serve as the input oligonucleotide for a subsequent circuit.

In other cases, a complex circuit may be designed so that the circuit producing the detectable signal is in series with more than one "feeder" circuits that act in parallel. Such a design may allow one to detect, for example, the presence of a target oligonucleotide as the input oligonucleotide for either of two or more feeder circuits. Each feeder circuit can independently produce an output oligonucleotide that acts as the input oligonucleotide for a subsequent circuit that produces a detectable signal. A detectable signal indicates the presence of the target oligonucleotide.

In some cases, the target oligonucleotides of the feeder circuits can be different from one another. Such a design may allow one to detect, for example, the presence of any one of a plurality of target nucleotides, each of which independently is the input oligonucleotide for one of the feeder circuits. Each feeder circuit can then independently produce an output oligonucleotide that acts as the input oligonucleotide for a subsequent circuit that produces a detectable signal. A detectable signal indicates the presence of any one or more of the target oligonucleotides.

In other cases, the target oligonucleotides of the feeder circuits can be different from one another with a downstream circuit that is activated only by the presence of multiple output oligonucleotides from the feeder circuits. Such a design may allow one to detect, for example, the presence of all of a plurality of target nucleotides, each of which independently is the input oligonucleotide for one of the feeder circuits. The combination of output oligonucleotides from the feeder circuits then acts as the input oligonucleotide for a subsequent circuit that produces a detectable signal. A detectable signal indicates the presence of all of the target oligonucleotides.

In other cases, a feeder circuit may produce multiple output oligonucleotides that serve as the inputs for multiple independent subsequent circuits. The inputs to these subsequent circuits may also be combined with other inputs as outlined above, to produce detectable signals.

In the preceding description and following claims, the term "and/or" means one or all of the listed elements or a combination of any two or more of the listed elements; the terms "comprises," "comprising," and variations thereof are to be construed as open ended—i.e., additional elements or steps are optional and may or may not be present; unless otherwise specified, "a," "an," "the," and "at least one" are used interchangeably and mean one or more than one; and the recitations of numerical ranges by endpoints include all numbers subsumed within that range (e.g., 1 to 5 includes 1, 1.5, 2, 2.75, 3, 3.80, 4, 5, etc.).

Reference throughout this specification to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout this specification are not necessarily referring to the same embodiment of the disclosure. Furthermore, particular embodiments may be described in isolation for clarity. Thus, unless otherwise expressly specified that the features of a particular embodiment are incompatible with the features of another embodiment, the particular features, configurations, compositions, or characteristics may be combined in any suitable manner in one or more embodiments. Thus, features described in the context of one embodiment may be combined with features described in the context of a different embodiment except where the features are necessarily mutually exclusive.

In the preceding description, particular embodiments may be described in isolation for clarity. Unless otherwise expressly specified that the features of a particular embodiment are incompatible with the features of another embodiment, certain embodiments can include a combination of compatible features described herein in connection with one or more embodiments.

For any method disclosed herein that includes discrete steps, the steps may be conducted in any feasible order. And, as appropriate, any combination of two or more steps may be conducted simultaneously.

The words "preferred" and "preferably" refer to embodiments of the invention that may afford certain benefits under certain circumstances. However, other embodiments may also be preferred under the same or other circumstances. Furthermore, the recitation of one or more preferred embodiments does not imply that other embodiments are not useful and is not intended to exclude other embodiments from the scope of the invention.

The present invention is illustrated by the following examples. It is to be understood that the particular examples, materials, amounts, and procedures are to be interpreted broadly in accordance with the scope and spirit of the invention as set forth herein.

EXAMPLES

DNA Oligonucleotides

Designs and oligonucleotide sequences were designed following the principles of leakless translator gate construction as previously described (Wang et al., 2018, *Proc Natl Acad Sci USA* 115(52):E12182-E12191). Additional sequence design was carried out using NUPACK (Wolfe et al., 2015, *ACS Synth Biol.* 4(10):1086-1100; Wolfe et al., 2017, *J Am Chem Soc.* 2017; 139(8):3134-3144; Zadeh et al., 2011, *J Comput Chem.* 2011; 32(1):170-173; Zadeh et al., 2011, *J Comput Chem.* 2011; 32:439-452) to produce minimally structured single strands and correctly folded gate complexes. Unmodified D-DNA oligonucleotides and all fluorophore-modified or quencher-modified oligonucleotides (both D-DNA and L-DNA) were purchased from Integrated DNA Technologies, Inc. (Coralville, Iowa). Unmodified L-DNA oligonucleotides and hybrid D-DNA/L-DNA oligonucleotides were purchased from ChemGenes Corp. (Wilmington, Mass.). All single strands for the inputs and gates were resuspended in TE buffer (10 mM Tris, 1 mM EDTA) at a concentration of 1 µM based on the synthesis yields as reported by the manufacturer. After the buffer was added, the DNA was vortexed, spun down, and stored at −20° C. freezer until needed. Reporter strands were resuspended at 100 nM using the same procedure.

Other Chemical Reagents

TE buffer and magnesium acetate were purchased from Millipore Sigma (Burlington, Mass.). TAE buffer, TBE buffer, Gibco DMEM, and Gibco Fetal Bovine Serum were purchased from Thermo Fisher Scientific, Inc. (Waltham, Mass.). Ammonium persulfate and acrylamide/bis were purchased from BioRad Laboratories, Inc. (Hercules, Calif.). Urea, TEMED, EDTA, magnesium chloride, ammonium acetate, bromophenol blue solution, and glycerol were purchased from VWR International, LLC (Radnor, Pa.).

Oligonucleotide Purification

Single DNA strands that were used as triggers or part of the gates were purified using a denaturing PAGE (dPAGE) gel. All dPAGE gel solutions were made with 8.3 M urea and in TBE buffer (89 mM Tris base, 89 mM Boric acid, 2 mM EDTA). Separate stacking gels and resolving gels were used to improve resolution. The resolving gel was made with 15% acrylamide:bis (19:1) solution and the stacking gel was made with 5% acrylamide:bis (19:1) solution. Resolving gel was poured and cured for 30 minutes while topped with isopropyl alcohol to prevent drying of the interface. The stacking gel was poured at a height of twice the well fill and cured for one hour. After curing, the dPAGE gel was pre-run for 30 minutes in TBE upper running buffer with active heating to 55° C. at 300 V. Samples were loaded using 2:1 glycerol:bromophenol blue solution and then run for 2.5 hours. After running, the DNA band was cut from the gel using a razor blade and UV light to visualize. The DNA was then extracted from the gel using an elution buffer of 500 mM ammonium acetate, 10 mM magnesium acetate, and 2 mM EDTA incubated at 37° C. overnight followed by ethanol precipitation. Concentrations of the strands were determined using a NANODROP spectrophotometer (Thermo Fisher Scientific, Inc., Waltham, Mass.) and the stated extinction coefficient as provided by the manufacturer.

Gate Complex Purification

After single strand purification, gates were prepared using equal stoichiometry of top and bottom strand in a TE buffer with 12.5 mM $Mg^{2+}$ from an $MgCl_2$ stock solution. Gates were annealed by raising the temperature to 95° C. for five minutes and then slowly ramping down to 20° C. over 1.5 hours. They were then purified using non-denaturing PAGE gels. The PAGE gel solutions were made in TAE buffer (40 mM Tris, 40 mM acetic acid, 1 mM EDTA) and 12.5 mM $Mg^{2+}$ from an $MgCl_2$ stock solution. The resolving gel was made with 12% acrylamide:bis (19:1) solution and the stacking gel was made with 6% acrylamide:bis (19:1) solution. The PAGE gel was poured similarly to the dPAGE gel with resolving and stacking gels. The PAGE gel run conditions were in TAE with $Mg^{2+}$ buffer with active cooling to 25° C. for five hours at 250 V, with the buffer exchanged every 90 minutes. Samples were loaded using 2:1 glycerol: Bromophenol Blue solution. After running, the DNA was extracted from the gel using an elution buffer of TE buffer with 12.5 mM $Mg^{2+}$ incubated at 30° C. overnight. Extinction coefficients for gate complexes were calculated using as previously described (Tataurov et al., 2008, *Biophys Chem.* 2008; 133(1-3):66-70). Stock concentrations of complexes were calculated using these extinction coefficients in conjunction with absorbance measurements taken on a NANODROP 2000c spectrophotometer (Thermo Fisher Scientific, Inc., Waltham, Mass.).

Reporter Formation

To avoid needing to quantify the fluorophore after running a gel, purified reporter strands were obtained from Integrated DNA Technologies, Inc. (Coralville, Iowa). The reporter complex was prepared using a 10% excess of quencher to reduce the chances of free fluorophore strands increasing background signal. The reporter complex was stored in TE buffer with 12.5 mM $Mg^{2+}$ from an $MgCl_2$ stock solution.

Assays in Buffer

The initial strand displacement reaction assays were run in TE $Mg^{2+}$ buffer (10 mM Tris, 1 mM EDTA, 12.5mM $Mg^{2+}$) with standard circuit component concentrations of 300 nM and a reaction volume of 15 µL. All buffer experiments were run in triplicate at ambient temperature in a 384-well plate. Sealing tape was used to prevent evaporation effects during the long run times. Fluorescence monitoring of the reaction was done on a plate reader (SYNERGY H1MG, BioTek Instruments, Inc., Winooski, Vt.) through a bottom read excitation wavelength of 497 nm and emission wavelength of 525 nm. Kinetic data was recorded with readings taken once every minute.

Assays in Serum

The serum assays were run similarly to the strand displacement assays in buffer. These experiments were run in 12.5 mM $Mg^{2+}$, 10% fetal bovine serum (FBS), and the remaining volume DMEM. The initial reaction volume was 15 µL. Inputs were added by spiking in 16 µL of 3 µM trigger. The plate was incubated in the plate reader (SYNERGY H1MG, BioTek Instruments, Inc., Winooski, Vt.) at 37° C. and data readings were taken every minute for the first 30 minutes and every five minutes for the remainder of the incubation time to avoid photo-bleaching of the reporter. After the incubation period, trigger was spiked into the reaction wells and the plate was re-sealed. A 10-second lateral shake was done by the plate reader before reading the fluorescence every minute. Reactions were run in triplicate. Excitation and emission wavelengths were the same as for assays in buffer.

Normalization of Fluorescence Data

Data shown in FIG. 1F was normalized to illustrate the linearity of activation, as follows. The negative control was taken as the average of the last 30 minutes of reporter only data. The positive control was taken as the average of the last 30 minutes of 1× input. The raw fluorescence readings were then normalized by linear interpolation between the appropriate chirality negative and positive controls.

Melt Curve Experiments

The melt curves of the three T1 gates (from the D>L, L>D, and D>D translators) were found by measuring absorbance at 260 nm (A260) over a range of temperatures. Complexes, prepared and purified as detailed above, were diluted to 3 µM concentration for measuring. The samples were run in quartz cuvettes on a spectrophotometer and attached temperature controller (CARY 300 UV-Vis, Agilent Technologies, Inc., Santa Clara, Calif.). The temperature started at 35° C. and was increased at a rate of 1° C./min up to 90° C. Absorbance measurements were taken every minute at a wavelength of 260 nm. The curves were normalized by taking the mean of the five lowest readings as "0" and the mean of the five highest readouts as "1". Then, the half-max point was calculated as the temperature at which the absorbance was halfway between the "0" and "1" normalized values.

Sequence Listing Free Text

Nucleotide Sequences

The following conventions are used in the nucleotide sequences that follow:

D-DNA nucleotide X is listed as X

L-DNA nucleotide X is listed as X

[5ATT0488N] represents a 5' ATTO 488 fluorophore modification

[3IABkFQ] represents a 3' Iowa Black dark quencher modification

G-t represents the "top" strand of gate complex G

G-b represents the "bottom" strands of gate complex G

The prefix L>D, the prefix D>L, and the prefix D>D identify the chirality of the input and output signals from translator gates The prefixes D and L identify the chirality of single strands.

SEQ ID NOs:1-7: Nucleotide sequences for D>L heterochiral translator circuit.

SEQ ID NOs:8-14: Nucleotide sequences for L>D heterochiral translator circuit.

SEQ ID NOs:15-21: Nucleotide sequences for D>D control translator circuit.

SEQ ID NOs:22-25: Additional nucleotide sequences for D>L heterochiral translator circuit with L-DNA toecaps on D-DNA strand termini (for use in conjunction with SEQ ID NOs:1,6,7).

```
                                                      SEQ ID NO: 1-D_X
CCCTTTCTCA TAATCTCACA CTTCTCCCAA

SEQ ID NO: 2-D>L_T1-t
TCTCATAATC TCACACTTCT CCCAACTTTA CCTACAAACT

SEQ ID NO: 3-D>L_T1-b
TAAAGTTGGG AGAAGTGTGA GATTATGAGA AAGGG

SEQ ID NO: 4-D>L_T2-t
CTTCTCCCAA CTTTACCTAC AAACTCTTAAT CTATTCCTCC ACCAACATTT

CATCACT

SEQ ID NO: 5-D>L_T2-b
ATAAGAGTTT GTAGGTAAAG TTGGGAGAAG TGTGA

SEQ ID NO: 6-L_R-t
CCTACAAACT CTTATCTATT CCTCCACCAA CATTTCATCA

CT[3IABkFQ]

SEQ ID NO: 7-L_R-b
[5ATTO488N]AGTGATGAAA TGTTGGTGGA GGAATAGATA AGAGTTTGTA GGTAAAG

SEQ ID NO: 8-L_X
CCCTTTCTCA TAATCTCACA CTTCTCCCAA

SEQ ID NO: 9-L>D_T1-t
TCTCATAATC TCACACTTCT CCCAACTTTA CCTACAAACT

SEQ ID NO: 10-L>D_T1-b
TAAAGTTGGG AGGAAGTGTGA GATTATGAGA AAGGG

SEQ ID NO: 11-L>D_T2-t
CTTCTCCCAA CTTTACCTAC AAACTCTTAT CTATTCCTCC ACCAACATTT

CATCACT

SEQ ID NO: 12-L>D_T2-b
ATAAGAGTTT GTAGGTAAAG TTGGGAGAAG TGTGA

SEQ ID NO: 13-D_R-t
CCTACAAACT CTTATCTATT CCTCCACCAA CATTTCATCA CT[3IABkFQ]

SEQ ID NO: 14-D_R-b
[5ATTO488N]AGTGATGAAA TGTTGGTGGA GGAATAGATAAGAGTTTGTA

GGTAAAG

SEQ ID NO: 15-D_X
CCCTTTCTCA TAATCTCACA CTTCTCCCAA

SEQ ID NO: 16-D>D_T1-t
TCTCATAATC TCACACTTCT CCCAACTTTA CCTACAAACT

SEQ ID NO: 17-D>D_T1-b
TAAAGTTGGG AGAAGTGTGA GATTATGAGA AAGGG

SEQ ID NO: 18-D>D_T2-t
CTTCTCCCAA CTTTACCTAC AAACTCTTAT CTATTCCTCC ACCAACATTT

CATCACT

SEQ ID NO: 19-D>D_T2-b
ATAAGAGTTT GTAGGTAAAG TTGGGAGAAG TGTGA

SEQ ID NO: 20-D_R-t
CCTACAAACT CTTATCTATT CCTCCACCAA CATTTCATCA CT[3IABkFQ]

SEQ ID NO: 21-D_R-b
[5ATTO488N]AGTGATGAAA TGTTGGTGGA GGAATAGATA AGAGTTTGTA

GGTAAAG
```

```
                                                SEQ ID NO: 22-D>L_T1-t_5'TC
TTTTTTCTCA TAATCTCACA CTTCTCCCAA CTTTACCTAC AAACT

SEQ ID NO: 23-D>L_T1-b_3'TC
TAAAGTTGGG AGAAGTGTGA GATTATGAGA AAGGGTTTTT

SEQ ID NO: 24-D>L_T2-t_5'TC
TTTTTCTTCT CCCAACTTTA CCTACAAACT CTTATCTATT CCTCCACCAA

CATTTCATCA CT

SEQ ID NO: 25-D>L_T2-b_3'TC
ATAAGAGTTT GTAGGTAAAG TTGGGAGAAG TGTGATTTTT

SEQ ID NO: 26-D>L_T1-t_5'TC_5A
AAAAATCTCA TAATCTCACA CTTCTCCCAA CTTTACCTACAAACT

SEQ ID NO: 27-D>L_T1-b_3'TC_5A
TAAAGTTGGG AGAAGTGTGA GATTATGAGA AAGGGAAAAA

SEQ ID NO: 28-D>L_T2-t_5'TC_5A
AAAAACTTCT CCCAACTTTA CCTACAAACT CTTATCTATT CCTCCACCAA

CATTTCATCA CT

SEQ ID NO: 29-D_X_5ATC
AAAAACCCTT TCTCATAATC TCACACTTCT CCCAAAAAAA

SEQ ID NO: 30-D_X_3ATC
AAACCCTTTC TCATAATCTC ACACTTCTCC CAAAAA

SEQ ID NO: 31-D_X_1ATC
ACCCTTTCTC ATAATCTCAC ACTTCTCCCA AA
```

The complete disclosure of all patents, patent applications, and publications, and electronically available material (including, for instance, nucleotide sequence submissions in, e.g., GenBank and RefSeq, and amino acid sequence submissions in, e.g., SwissProt, PIR, PRF, PDB, and translations from annotated coding regions in GenBank and RefSeq) cited herein are incorporated by reference in their entirety. In the event that any inconsistency exists between the disclosure of the present application and the disclosure(s) of any document incorporated herein by reference, the disclosure of the present application shall govern. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

Unless otherwise indicated, all numbers expressing quantities of components, molecular weights, and so forth used in the specification and claims are to be understood as being modified in all instances by the term "about." Accordingly, unless otherwise indicated to the contrary, the numerical parameters set forth in the specification and claims are approximations that may vary depending upon the desired properties sought to be obtained by the present invention. At the very least, and not as an attempt to limit the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. All numerical values, however, inherently contain a range necessarily resulting from the standard deviation found in their respective testing measurements.

All headings are for the convenience of the reader and should not be used to limit the meaning of the text that follows the heading, unless so specified.

What is claimed is:

1. A heterochiral strand displacement molecular circuit comprising:
    an input oligonucleotide having a first chirality;
    a first translator comprising:
        an input binding domain, at least a portion of which is complementary to, and has the same chirality as, the input oligonucleotide; and
        a translation domain having a second chirality opposite the first chirality;
    a second translator comprising:
        a first nucleotide sequence, at least a portion of which has the same chirality as the input binding domain; and
        a second nucleotide sequence, at least a portion of which is complementary to, and has the same chirality as, the translation domain of the first translator; and
    an output oligonucleotide, at least a portion of which is complementary to, and has the same chirality as, the second translator.

2. The heterochiral strand displacement molecular circuit of claim 1, wherein the output oligonucleotide comprises a detectable signal.

3. The heterochiral strand displacement molecular circuit of claim 2, wherein the detectable signal comprises a colorimetric label, a fluorescent label, a radioactive label, or a magnetic label.

4. The heterochiral strand displacement molecular circuit of claim 2, wherein the detectable signal comprises a detectable biological activity of the output oligonucleotide.

5. The heterochiral strand displacement molecular circuit of claim 4, wherein the detectable biological activity comprises the output oligonucleotide interacting with a naturally occurring nucleic acid, thereby detectably repressing activity of the naturally occurring nucleic acid.

6. The heterochiral strand displacement molecular circuit of claim 1, wherein the first chirality is right-handed (D) and the second chirality is left-handed (L).

7. The heterochiral strand displacement molecular circuit of claim 1, wherein the first chirality is left-handed (L) and the second chirality is right-handed (D).

8. The heterochiral strand displacement molecular circuit of claim 1, further comprising:
a third translator comprising:
an input binding domain, at least a portion of which is complementary to, and has the same chirality as, the output oligonucleotide; and
a translation domain having a chirality opposite the input binding domain;
a fourth translator comprising a nucleotide sequence, at least a portion of which is complementary to, and has the same chirality as, the translation domain of the third translator; and
a final output oligonucleotide, at least a portion of which is complementary to, and has the same chirality as, the fourth translator.

* * * * *

SEQUENCE LISTING

```
<160> NUMBER OF SEQ ID NOS: 31

<210> SEQ ID NO 1
<211> LENGTH: 30
<212> TYPE: DNA
<213> ORGANISM: Artificial
<220> FEATURE:
<223> OTHER INFORMATION: Polynucleotide

<400> SEQUENCE: 1
ccctttctca taatctcaca cttctcccaa                                   30

<210> SEQ ID NO 2
```

```
<211> LENGTH: 40
<212> TYPE: DNA
<213> ORGANISM: Artificial
<220> FEATURE:
<223> OTHER INFORMATION: Polynucleotide
<220> FEATURE:
<221> NAME/KEY: L-DNA
<222> LOCATION: (26)..(40)

<400> SEQUENCE: 2
tctcataatc tcacacttct cccaacttta cctacaaact                    40

<210> SEQ ID NO 3
<211> LENGTH: 35
<212> TYPE: DNA
<213> ORGANISM: Artificial
<220> FEATURE:
<223> OTHER INFORMATION: Polynucleotide
<220> FEATURE:
<221> NAME/KEY: L-DNA
<222> LOCATION: (1)..(5)

<400> SEQUENCE: 3
taaagttggg agaagtgtga gattatgaga aaggg                         35

<210> SEQ ID NO 4
<211> LENGTH: 57
<212> TYPE: DNA
<213> ORGANISM: Artificial
<220> FEATURE:
<223> OTHER INFORMATION: Polynucleotide
<220> FEATURE:
<221> NAME/KEY: L-DNA
<222> LOCATION: (11)..(57)

<400> SEQUENCE: 4
cttctcccaa ctttacctac aaactcttat ctattcctcc accaacattt catcact     57

<210> SEQ ID NO 5
<211> LENGTH: 35
<212> TYPE: DNA
<213> ORGANISM: Artificial
<220> FEATURE:
<223> OTHER INFORMATION: Polynucleotide
<220> FEATURE:
<221> NAME/KEY: L-DNA
<222> LOCATION: (1)..(20)

<400> SEQUENCE: 5
ataagagttt gtaggtaaag ttgggagaag tgtga                         35

<210> SEQ ID NO 6
<211> LENGTH: 42
<212> TYPE: DNA
<213> ORGANISM: Artificial
<220> FEATURE:
<223> OTHER INFORMATION: Polynucleotide
<220> FEATURE:
<221> NAME/KEY: L-DNA
<222> LOCATION: (1)..(42)

<400> SEQUENCE: 6
cctacaaact cttatctatt cctccaccaa catttcatca ct                 42

<210> SEQ ID NO 7
<211> LENGTH: 47
<212> TYPE: DNA
<213> ORGANISM: Artificial
<220> FEATURE:
```

```
<223> OTHER INFORMATION: Polynucleotide
<220> FEATURE:
<221> NAME/KEY: L-DNA
<222> LOCATION: (1)..(47)

<400> SEQUENCE: 7
agtgatgaaa tgttggtgga ggaatagata agagtttgta ggtaaag          47

<210> SEQ ID NO 8
<211> LENGTH: 30
<212> TYPE: DNA
<213> ORGANISM: Artificial
<220> FEATURE:
<223> OTHER INFORMATION: Polynucleotide
<220> FEATURE:
<221> NAME/KEY: L-DNA
<222> LOCATION: (1)..(30)

<400> SEQUENCE: 8
ccctttctca taatctcaca cttctcccaa                             30

<210> SEQ ID NO 9
<211> LENGTH: 40
<212> TYPE: DNA
<213> ORGANISM: Artificial
<220> FEATURE:
<223> OTHER INFORMATION: Polynucleotide
<220> FEATURE:
<221> NAME/KEY: L-DNA
<222> LOCATION: (1)..(25)

<400> SEQUENCE: 9
tctcataatc tcacacttct cccaacttta cctacaaact                  40

<210> SEQ ID NO 10
<211> LENGTH: 35
<212> TYPE: DNA
<213> ORGANISM: Artificial
<220> FEATURE:
<223> OTHER INFORMATION: Polynucleotide
<220> FEATURE:
<221> NAME/KEY: L-DNA
<222> LOCATION: (6)..(35)

<400> SEQUENCE: 10
taaagttggg agaagtgtga gattatgaga aaggg                       35

<210> SEQ ID NO 11
<211> LENGTH: 57
<212> TYPE: DNA
<213> ORGANISM: Artificial
<220> FEATURE:
<223> OTHER INFORMATION: Polynucleotide
<220> FEATURE:
<221> NAME/KEY: L-DNA
<222> LOCATION: (1)..(10)

<400> SEQUENCE: 11
cttctcccaa ctttacctac aaactcttat ctattcctcc accaacattt catcact   57

<210> SEQ ID NO 12
<211> LENGTH: 35
<212> TYPE: DNA
<213> ORGANISM: Artificial
<220> FEATURE:
<223> OTHER INFORMATION: Polynucleotide
<220> FEATURE:
<221> NAME/KEY: L-DNA
<222> LOCATION: (21)..(35)
```

<400> SEQUENCE: 12
ataagagttt gtaggtaaag ttgggagaag tgtga                          35

<210> SEQ ID NO 13
<211> LENGTH: 42
<212> TYPE: DNA
<213> ORGANISM: Artificial
<220> FEATURE:
<223> OTHER INFORMATION: Polynucleotide

<400> SEQUENCE: 13
cctacaaact cttatctatt cctccaccaa catttcatca ct                  42

<210> SEQ ID NO 14
<211> LENGTH: 47
<212> TYPE: DNA
<213> ORGANISM: Artificial
<220> FEATURE:
<223> OTHER INFORMATION: Polynucleotide

<400> SEQUENCE: 14
agtgatgaaa tgttggtgga ggaatagata agagtttgta ggtaaag             47

<210> SEQ ID NO 15
<211> LENGTH: 30
<212> TYPE: DNA
<213> ORGANISM: Artificial
<220> FEATURE:
<223> OTHER INFORMATION: Polynucleotide

<400> SEQUENCE: 15
ccctttctca taatctcaca cttctcccaa                                30

<210> SEQ ID NO 16
<211> LENGTH: 40
<212> TYPE: DNA
<213> ORGANISM: Artificial
<220> FEATURE:
<223> OTHER INFORMATION: Polynucleotide

<400> SEQUENCE: 16
tctcataatc tcacacttct cccaacttta cctacaaact                     40

<210> SEQ ID NO 17
<211> LENGTH: 35
<212> TYPE: DNA
<213> ORGANISM: Artificial
<220> FEATURE:
<223> OTHER INFORMATION: Polynucleotide

<400> SEQUENCE: 17
taaagttggg agaagtgtga gattatgaga aggg                           35

<210> SEQ ID NO 18
<211> LENGTH: 57
<212> TYPE: DNA
<213> ORGANISM: Artificial
<220> FEATURE:
<223> OTHER INFORMATION: Polynucleotide

<400> SEQUENCE: 18
cttctcccaa ctttacctac aaactcttat ctattcctcc accaacattt catcact  57

<210> SEQ ID NO 19

```
<211> LENGTH: 35
<212> TYPE: DNA
<213> ORGANISM: Artificial
<220> FEATURE:
<223> OTHER INFORMATION: Polynucleotide

<400> SEQUENCE: 19
ataagagttt gtaggtaaag ttgggagaag tgtga                           35

<210> SEQ ID NO 20
<211> LENGTH: 42
<212> TYPE: DNA
<213> ORGANISM: Artificial
<220> FEATURE:
<223> OTHER INFORMATION: Polynucleotide

<400> SEQUENCE: 20
cctacaaact cttatctatt cctccaccaa catttcatca ct                   42

<210> SEQ ID NO 21
<211> LENGTH: 47
<212> TYPE: DNA
<213> ORGANISM: Artificial
<220> FEATURE:
<223> OTHER INFORMATION: Polynucleotide

<400> SEQUENCE: 21
agtgatgaaa tgttggtgga ggaatagata agagtttgta ggtaaag              47

<210> SEQ ID NO 22
<211> LENGTH: 45
<212> TYPE: DNA
<213> ORGANISM: Artificial
<220> FEATURE:
<223> OTHER INFORMATION: Polynucleotide
<220> FEATURE:
<221> NAME/KEY: L-DNA
<222> LOCATION: (1)..(5)
<220> FEATURE:
<221> NAME/KEY: L-DNA
<222> LOCATION: (31)..(45)

<400> SEQUENCE: 22 tttttctca taatctcaca cttctcccaa ctttacctac aaact                 45

<210> SEQ ID NO 23
<211> LENGTH: 40
<212> TYPE: DNA
<213> ORGANISM: Artificial
<220> FEATURE:
<223> OTHER INFORMATION: Polynucleotide
<220> FEATURE:
<221> NAME/KEY: L-DNA
<222> LOCATION: (1)..(5)
<220> FEATURE:
<221> NAME/KEY: L-DNA
<222> LOCATION: (36)..(40)

<400> SEQUENCE: 23
taaagttggg agaagtgtga gattatgaga aagggttttt                      40

<210> SEQ ID NO 24
<211> LENGTH: 62
<212> TYPE: DNA
<213> ORGANISM: Artificial
<220> FEATURE:
<223> OTHER INFORMATION: Polynucleotide
<220> FEATURE:
<221> NAME/KEY: L-DNA
```

```
<222> LOCATION: (1)..(5)
<220> FEATURE:
<221> NAME/KEY: L-DNA
<222> LOCATION: (16)..(62)

<400> SEQUENCE: 24
tttttcttct cccaacttta cctacaaact cttatctatt cctccaccaa catttcatca    60
ct                                                                   62

<210> SEQ ID NO 25
<211> LENGTH: 40
<212> TYPE: DNA
<213> ORGANISM: Artificial
<220> FEATURE:
<223> OTHER INFORMATION: Polynucleotide

<400> SEQUENCE: 25
ataagagttt gtaggtaaag ttgggagaag tgtgattttt                          40

<210> SEQ ID NO 26
<211> LENGTH: 45
<212> TYPE: DNA
<213> ORGANISM: Artificial
<220> FEATURE:
<223> OTHER INFORMATION: Polynucleotide
<220> FEATURE:
<221> NAME/KEY: L-DNA
<222> LOCATION: (1)..(5)
<220> FEATURE:
<221> NAME/KEY: L-DNA
<222> LOCATION: (31)..(45)

<400> SEQUENCE: 26
aaaaatctca taatctcaca cttctcccaa ctttacctac aaact                    45

<210> SEQ ID NO 27
<211> LENGTH: 40
<212> TYPE: DNA
<213> ORGANISM: Artificial
<220> FEATURE:
<223> OTHER INFORMATION: Polynucleotide
<220> FEATURE:
<221> NAME/KEY: L-DNA
<222> LOCATION: (1)..(5)
<220> FEATURE:
<221> NAME/KEY: L-DNA
<222> LOCATION: (36)..(40)

<400> SEQUENCE: 27
taaagttggg agaagtgtga gattatgaga aagggaaaaa                          40

<210> SEQ ID NO 28
<211> LENGTH: 62
<212> TYPE: DNA
<213> ORGANISM: Artificial
<220> FEATURE:
<223> OTHER INFORMATION: Polynucleotide
<220> FEATURE:
<221> NAME/KEY: L-DNA
<222> LOCATION: (1)..(5)
<220> FEATURE:
<221> NAME/KEY: L-DNA
<222> LOCATION: (16)..(62)

<400> SEQUENCE: 28
aaaaacttct cccaacttta cctacaaact cttatctatt cctccaccaa catttcatca    60
ct                                                                   62
```

```
<210> SEQ ID NO 29
<211> LENGTH: 40
<212> TYPE: DNA
<213> ORGANISM: Artificial
<220> FEATURE:
<223> OTHER INFORMATION: Polynucleotide
<220> FEATURE:
<221> NAME/KEY: L-DNA
<222> LOCATION: (1)..(5)
<220> FEATURE:
<221> NAME/KEY: L-DNA
<222> LOCATION: (36)..(40)

<400> SEQUENCE: 29
aaaaaccctt tctcataatc tcacacttct cccaaaaaaa                                40

<210> SEQ ID NO 30
<211> LENGTH: 36
<212> TYPE: DNA
<213> ORGANISM: Artificial
<220> FEATURE:
<223> OTHER INFORMATION: Polynucleotide
<220> FEATURE:
<221> NAME/KEY: L-DNA
<222> LOCATION: (1)..(3)
<220> FEATURE:
<221> NAME/KEY: L-DNA
<222> LOCATION: (33)..(36)

<400> SEQUENCE: 30 aaacccttte tcataatctc acacttctcc caaaaa                                    36

<210> SEQ ID NO 31
<211> LENGTH: 32
<212> TYPE: DNA
<213> ORGANISM: Artificial
<220> FEATURE:
<223> OTHER INFORMATION: Polynucleotide
<220> FEATURE:
<221> NAME/KEY: L-DNA
<222> LOCATION: (1)..(1)
<220> FEATURE:
<221> NAME/KEY: L-DNA
<222> LOCATION: (32)..(32)

<400> SEQUENCE: 31
accctttctc ataatctcac acttctccca aa                                        32
```